US012320500B2

(12) United States Patent
Feit et al.

(10) Patent No.: US 12,320,500 B2
(45) Date of Patent: *Jun. 3, 2025

(54) MOUNTING BRACKET FOR FLUSH MOUNT LIGHTING FIXTURE

(71) Applicant: Feit Electric Company, Inc., Pico Rivera, CA (US)

(72) Inventors: Alan Feit, Encino, CA (US); Brian Halliwell, Pico Rivera, CA (US)

(73) Assignee: FEIT ELECTRIC COMPANY, INC., Pico Rivera, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/508,829

(22) Filed: Nov. 14, 2023

(65) Prior Publication Data

US 2024/0077191 A1 Mar. 7, 2024

Related U.S. Application Data

(63) Continuation of application No. 17/573,204, filed on Jan. 11, 2022, now Pat. No. 11,852,324, which is a (Continued)

(51) Int. Cl.
*F21V 21/03* (2006.01)
*E04B 9/00* (2006.01)

(Continued)

(52) U.S. Cl.
CPC .............. *F21V 21/03* (2013.01); *E04B 9/006* (2013.01); *F21S 8/043* (2013.01); *F21S 8/061* (2013.01);

(Continued)

(58) Field of Classification Search
None
See application file for complete search history.

(56) References Cited

U.S. PATENT DOCUMENTS 2,518,774 A 8/1950 Grosser
2,545,124 A 3/1951 Tornblom (Continued)

FOREIGN PATENT DOCUMENTS

CN 202546560 U 11/2012
EP 2473002 A2 7/2012

(Continued)

OTHER PUBLICATIONS

U.S. Appl. No. 17/573,204, filed Jan. 11, 2022, 2022/0136684, Allowed.

(Continued)

*Primary Examiner* — Alan B Cariaso
(74) *Attorney, Agent, or Firm* — Alston & Bird LLP

(57) ABSTRACT

A mounting bracket for flush mounting a lighting device is provided. The mounting bracket comprises: a first planar member and a second planar member, at least one of the first and second planar members having a center, and one or two transverse members disposed at opposite ends of at least one of the first and second planar members, wherein at least one of the first and second planar members includes two adjacent openings and a receiving member offset from the center of the at least one of the first and second planar members, the receiving member being positioned intermediate the two openings.

20 Claims, 16 Drawing Sheets

Related U.S. Application Data continuation of application No. 17/116,428, filed on Dec. 9, 2020, now Pat. No. 11,248,776, which is a continuation of application No. 16/551,194, filed on Aug. 26, 2019, now Pat. No. 10,895,368, which is a continuation of application No. 15/898,711, filed on Feb. 19, 2018, now Pat. No. 10,473,306, which is a continuation of application No. 15/272,645, filed on Sep. 22, 2016, now Pat. No. 9,927,103, which is a continuation-in-part of application No. 14/720,255, filed on May 22, 2015, now Pat. No. 9,835,300.

(60) Provisional application No. 62/002,088, filed on May 22, 2014.

(51) Int. Cl.

| | |
|---|---|
| ***F21S 8/04*** | (2006.01) |
| ***F21S 8/06*** | (2006.01) |
| ***F21Y 105/00*** | (2016.01) |
| ***F21Y 115/10*** | (2016.01) |

(52) U.S. Cl.

CPC ....... *F21Y 2105/00* (2013.01); *F21Y 2115/10* (2016.08)

(56) References Cited

U.S. PATENT DOCUMENTS

| | | | | |
|---|---|---|---|---|
| 3,506,232 | A | 4/1970 | Wolar et al. | |
| 3,780,973 | A | 12/1973 | Dalton | |
| 4,426,126 | A | 1/1984 | De et al. | |
| 5,056,954 | A | 10/1991 | Flux et al. | |
| 5,560,101 | A | 10/1996 | Sandell et al. | |
| 5,806,972 | A | 9/1998 | Kaiser et al. | |
| 6,296,372 | B1 | 10/2001 | Rhomberg | |
| 6,328,461 | B1 | 12/2001 | Younker | |
| 6,517,216 | B1 | 2/2003 | Cercone et al. | |
| 6,653,558 | B1 | 11/2003 | Bucher et al. | |
| 6,769,785 | B1 | 8/2004 | Herst et al. | |
| 6,880,963 | B2 | 4/2005 | Luig et al. | |
| 6,991,352 | B2 | 1/2006 | Garber et al. | |
| 7,111,957 | B2 | 9/2006 | Bernhart et al. | |
| 7,213,938 | B2 | 5/2007 | Brondt et al. | |
| 7,547,112 | B2 | 6/2009 | Kim | |
| 7,631,994 | B2 | 12/2009 | Halliwell et al. | |
| 7,866,850 | B2 | 1/2011 | Alexander et al. | |
| 8,047,673 | B2 | 11/2011 | Santoro | |
| 8,152,336 | B2 | 4/2012 | Alexander et al. | |
| 8,297,579 | B1 | 10/2012 | Gretz | |
| 8,376,592 | B2 | 2/2013 | Engstrom et al. | |
| 8,382,341 | B2 | 2/2013 | Peter | |
| 8,485,700 | B2 | 7/2013 | Ngai | |
| 8,613,529 | B2 | 12/2013 | Watanabe et al. | |
| 8,622,590 | B2 | 1/2014 | Cheng | |
| 8,714,775 | B2 | 5/2014 | Bracher et al. | |
| 8,915,636 | B2 | 12/2014 | Araki et al. | |
| 8,950,921 | B2 | 2/2015 | Sheng | |
| 9,133,981 | B2 | 9/2015 | Lenherr | |
| 9,188,290 | B2 | 11/2015 | Lay et al. | |
| 9,194,561 | B2 | 11/2015 | Wu et al. | |
| 9,228,724 | B2 | 1/2016 | Wu | |
| 9,285,081 | B2 | 3/2016 | Douglas et al. | |
| 9,297,506 | B2 | 3/2016 | Magnan et al. | |
| 9,447,949 | B2 | 9/2016 | Rashidi Doust | |
| 9,453,616 | B2 | 9/2016 | Myers et al. | |
| 9,702,533 | B1 | 7/2017 | Harpenau et al. | |
| 9,714,760 | B2 | 7/2017 | Scoggin | |
| 9,835,300 | B2 | 12/2017 | Feit et al. | |
| 9,897,305 | B2 | 2/2018 | Ryder et al. | |
| 9,927,103 | B2 | 3/2018 | Feit et al. | |
| 10,047,937 | B2 | 8/2018 | Halliwell | |
| 10,234,115 | B2 | 3/2019 | Halliwell | |
| 10,429,044 | B2 | 10/2019 | Halliwell | |
| 10,465,871 | B2 | 11/2019 | Feit et al. | |
| 10,473,306 | B2 | 11/2019 | Feit et al. | |
| 10,634,320 | B2 | 4/2020 | Halliwell | |
| 10,845,015 | B2 | 11/2020 | Brothwell | |
| 10,859,244 | B2 | 12/2020 | Halliwell | |
| 10,895,368 | B2 | 1/2021 | Feit et al. | |
| 10,969,070 | B2 | 4/2021 | Feit et al. | |
| 11,085,614 | B2 | 8/2021 | Halliwell | |
| 11,248,776 | B2 | 2/2022 | Feit et al. | |
| 11,255,522 | B2 | 2/2022 | Halliwell | |
| 11,339,935 | B2 | 5/2022 | Feit et al. | |
| 11,555,599 | B2 | 1/2023 | Halliwell | |
| 11,852,324 | B2 * | 12/2023 | Feit | F21V 21/03 |
| 2003/0060067 | A1 | 3/2003 | Kerr | |
| 2003/0082948 | A1 | 5/2003 | Hakkarainen et al. | |
| 2003/0147749 | A1 | 8/2003 | Kerr | |
| 2006/0108137 | A1 | 5/2006 | Smith | |
| 2009/0237958 | A1 | 9/2009 | Kim | |
| 2010/0208473 | A1 | 8/2010 | Sakai et al. | |
| 2010/0220497 | A1 | 9/2010 | Ngai | |
| 2011/0185609 | A1 | 8/2011 | Miedema et al. | |
| 2012/0106177 | A1 | 5/2012 | Blankestijn et al. | |
| 2012/0266449 | A1 | 10/2012 | Krupa | |
| 2013/0016504 | A1 | 1/2013 | Garber | |
| 2013/0044512 | A1 | 2/2013 | Araki et al. | |
| 2013/0286667 | A1 | 10/2013 | Sampsell et al. | |
| 2013/0292149 | A1 | 11/2013 | Cooper et al. | |
| 2013/0307420 | A1 | 11/2013 | Yoder et al. | |
| 2014/0063776 | A1 | 3/2014 | Clark et al. | |
| 2014/0071687 | A1 | 3/2014 | Tickner et al. | |
| 2014/0092608 | A1 | 4/2014 | Moser et al. | |
| 2014/0160772 | A1 | 6/2014 | Wu | |
| 2014/0268766 | A1 | 9/2014 | Lu | |
| 2014/0268825 | A1 | 9/2014 | Lay et al. | |
| 2014/0313775 | A1 | 10/2014 | Myers et al. | |
| 2015/0009666 | A1 | 1/2015 | Keng et al. | |
| 2015/0016105 | A1 | 1/2015 | Lin et al. | |
| 2015/0085499 | A1 | 3/2015 | Mandy et al. | |
| 2015/0153031 | A1 | 6/2015 | Myers et al. | |
| 2015/0167903 | A1 | 6/2015 | Yao | |
| 2015/0267873 | A1 | 9/2015 | Price et al. | |
| 2015/0309248 | A1 | 10/2015 | Xu | |
| 2015/0316241 | A1 | 11/2015 | Kaplan et al. | |
| 2015/0338038 | A1 | 11/2015 | Feit et al. | |
| 2015/0338071 | A1 | 11/2015 | Feit et al. | |
| 2016/0033098 | A1 | 2/2016 | Bergman et al. | |
| 2016/0131346 | A1 | 5/2016 | Creasman et al. | |
| 2017/0009962 | A1 | 1/2017 | Feit et al. | |
| 2018/0003366 | A1 | 1/2018 | Halliwell | |
| 2018/0003367 | A1 | 1/2018 | Halliwell | |
| 2019/0368701 | A1 | 12/2019 | Halliwell | |
| 2021/0332971 | A1 | 10/2021 | Halliwell | |
| 2022/0136684 | A1 | 5/2022 | Feit et al. | |
| 2022/0136685 | A1 | 5/2022 | Halliwell | |
| 2022/0252230 | A1 | 8/2022 | Feit et al. | |
| 2023/0119998 | A1 | 4/2023 | Halliwell | |

FOREIGN PATENT DOCUMENTS

| | | | |
|---|---|---|---|
| KR | 10-1398387 | B1 | 5/2014 |
| WO | 2006/037572 | A1 | 4/2006 |

OTHER PUBLICATIONS

U.S. Appl. No. 17/116,428, filed Dec. 9, 2020, U.S. Pat. No. 11,248,776, Issued.

U.S. Appl. No. 16/551,194, filed Aug. 26, 2019, U.S. Pat. No. 10,895,368, Issued.

U.S. Appl. No. 15/898,711, filed Feb. 19, 2018, U.S. Pat. No. 10,473,306, Issued.

U.S. Appl. No. 15/272,645, filed Sep. 22, 2016, U.S. Pat. No. 9,927,103, Issued.

U.S. Appl. No. 14/720,255, filed May 22, 2015, U.S. Pat. No. 9,835,300, Issued.

Canadian Intellectual Property Office, Requisition by the Examiner for Application No. 2,971,917, dated Jan. 26, 2018, 5 pages, Canada.

(56) References Cited

OTHER PUBLICATIONS

Canadian Intellectual Property Office, Requisition by the Examiner for Application No. 2,979,140, dated Mar. 22, 2018, 5 pages, Canada.
Canadian Intellectual Property Office, Requisition by the Examiner for Application No. 2,979,652, dated Jun. 26, 2018, 4 pages, Canada.
NonFinal Office Action for U.S. Appl. No. 15/800,409, dated Mar. 8, 2019, (26 pages), United States Patent and Trademark Office, US.
NonFinal Office Action for U.S. Appl. No. 16/036,470, dated Oct. 4, 2018, (5 pages), United States Patent and Trademark Office, US.
NonFinal Office Action for U.S. Appl. No. 16/262,287, dated May 24, 2019, (7 pages), United States Patent and Trademark Office, US.
NonFinal Office Action for U.S. Appl. No. 16/551,194, dated Apr. 16, 2020, (12 pages), United States Patent and Trademark Office, US.
NonFinal Office Action for U.S. Appl. No. 16/573,140, dated Aug. 12, 2020, (10 pages), United States Patent and Trademark Office, US.
NonFinal Office Action for U.S. Appl. No. 17/660,867, dated Dec. 21, 2022, (16 pages), United States Patent and Trademark Office, US.
Notice of Allowance for U.S. Appl. No. 16/262,287, dated Jun. 13, 2019, (7 pages), United States Patent and Trademark Office, US.
Notice of Allowance for U.S. Appl. No. 16/573,140, dated Dec. 30, 2020, (8 pages), United States Patent and Trademark Office, US.
Office Action for U.S. Appl. No. 15/295,519 dated Mar. 8, 2019.
Office Action for U.S. Office Action U.S. Appl. No. 15/295,517, dated Feb. 28, 2019, 11 pages.
OKTLighting, www.youtube.com/watch?v=xrtp1RTxsEQ, Jan. 21, 2016, timestamp 0:00, 0:14, 0:21-22, 0:27-31, 0:48-1:06.
U.S. Appl. No. 15/196,683, filed Jun. 29, 2016, U.S. Pat. No. 10,047,937, Patented.
U.S. Appl. No. 15/272,645, “Flush Mount Lighting Fixture”, (filed Sep. 22, 2016), (Alan Barry Feit, Inventor), (Feit Electric Company, Inc., assignee).
U.S. Appl. No. 15/295,519, filed Oct. 17, 2016, U.S. Pat. No. 10,634,320.
United State Patent and Trademark Office, Office Action for U.S. Appl. No. 15/196,683, dated Jan. 16, 2018, 12 pages, U.S.A.
United States Patent and Trademark Office, Non-Final Office Action for U.S. Appl. No. 17/573,204, filed Dec. 19, 2022, 26 pages, U.S.A.
United States Patent and Trademark Office, Non-Final Office Action for U.S. Appl. No. 17/573,204, filed Jun. 13, 2023, 25 pages, U.S.A.
United States Patent and Trademark Office, Corrected Notice of Allowability for U.S. Appl. No. 15/272,645, filed Feb. 23, 2018, (3 pages), U.S.A.
United States Patent and Trademark Office, Notice of Allowance for U.S. Appl. No. 15/196,683, filed May 2, 2018, 8 pages, U.S.A.
United States Patent and Trademark Office, Notice of Allowance for U.S. Appl. No. 14/720,255, dated Aug. 3, 2016, 14 pages, U.S.A.
United States Patent and Trademark Office, Notice of Allowance for U.S. Appl. No. 15/272,645, dated Nov. 16, 2017, 14 pages, U.S.A.
United States Patent and Trademark Office, Notice of Allowance received for U.S. Appl. No. 16/822,962, filed Apr. 28, 2021, 20 pages, U.S.
United States Patent and Trademark Office, Office Action for U.S. Appl. No. 14/720,255, Nov. 1, 2016, 20 pages, U.S.A.
United States Patent and Trademark Office, Office Action for U.S. Appl. No. 14/720,255, dated Apr. 26, 2017, 16 pages, U.S.A.
United States Patent and Trademark Office, Office Action for U.S. Appl. No. 15/295,519, dated Aug. 24, 2018, 13 pages, U.S.A.
United States Patent and Trademark Office, Office Action for U.S. Appl. No. 15/295,519, filed Oct. 31, 2019, (15 pages), U.S.A.
United States Patent and Trademark Office, Office Action for U.S. Appl. No. 15/898,711, filed Jul. 22, 2019, (14 pages), U.S.A.
Non-Final Rejection Mailed on Jun. 20, 2024 for U.S. Appl. No. 18/239,280, 17 page(s).

* cited by examiner

MOUNTING BRACKET FOR FLUSH MOUNT LIGHTING FIXTURE

CROSS-REFERENCE TO RELATED APPLICATIONS

This application is a continuation of U.S. patent application Ser. No. 17/573,204, filed Jan. 11, 2022, which is a continuation of U.S. patent application Ser. No. 17/116,428, filed Dec. 9, 2020 (and now U.S. Pat. No. 11,248,776), which is a continuation of U.S. patent application Ser. No. 16/551,194, filed Aug. 26, 2019 (and now U.S. Pat. No. 10,895,368), which is a continuation of U.S. patent application Ser. No. 15/898,711, filed Feb. 19, 2018 (and now U.S. Pat. No. 10,473,306), which is a continuation of U.S. patent application Ser. No. 15/272,645, filed Sep. 22, 2016 (and now U.S. Pat. No. 9,927,103), which is a continuation-in-part of U.S. patent application Ser. No. 14/720,255, filed May 22, 2015 (and now U.S. Pat. No. 9,835,300), which is a non-provisional of U.S. Provisional Application Ser. No. 62/002,088, filed May 22, 2014; the contents of all of which as are hereby incorporated herein by reference in their entireties.

BACKGROUND

Flat panel lighting fixtures are a convenient lighting option as they can be mounted to a mounting surface and have a relatively low profile compared to other lighting fixtures. Light emitting diode (LED) flat panel lighting fixtures, in particular, generally cannot be mounted through traditional lighting fixture methods. For example, generally the lens of LED flat panel lighting fixtures is secured to the fixture. Thus, an LED flat panel lighting fixture cannot be secured to a mounting surface through by a fastener passing through the back of the lighting fixture.

Therefore, there is a need for new and improved methods and mounting systems for easily and securely mounting an LED flat panel lighting fixture to a mounting surface.

BRIEF SUMMARY

Generally described, various embodiments of the present invention comprise an LED lighting fixture comprising an LED flat panel lighting device and a mounting bracket configured for mounting the LED flat panel lighting device to a mounting surface. For example, the mounting bracket may be configured to flush mount the LED flat panel lighting device to a junction box within a ceiling, wall, or other mounting surface. In example embodiments, the LED flat panel lighting device may comprise a tether configured to suspend the lighting device from the mounting bracket during at least a portion of the process of installing the LED lighting fixture. In an example embodiment, the mounting bracket is a T-bar mounting bracket configured to flush mount an LED flat panel lighting device to a junction box within a mounting surface.

According to one aspect of the present invention, a lighting fixture is provided. In an example embodiment, the lighting fixture comprises a light emitting diode (LED) flat panel lighting device and a mounting bracket. The LED flat panel lighting device comprises a front cover, a back cover, a frame, and at least one LED mounted within the interior of the LED flat panel light. The frame has an interior edge. The interior edge is in contact with a perimeter of the front cover and a perimeter of the back cover. The front cover, the back cover, and the frame define an interior of the LED flat panel light. At least one of the frame and the back cover comprises one or more attachment mechanisms. The mounting bracket comprises a junction box mounting element configured for securing the mounting bracket to a junction box or a mounting surface, and one or more attachment mechanism mating elements configured to mate with the one or more attachment mechanisms when the LED flat panel lighting device is rotated within the mounting bracket to secure the LED flat panel lighting device into the mounting bracket.

According to another aspect of the present invention, a lighting device is provided. In example embodiments, the lighting device comprises a front cover, a back cover, and a frame. The frame has an interior edge which is in contact with a perimeter of the front cover and a perimeter of the back cover. The front cover, the back cover, and the frame define an interior of the lighting device. The lighting device further comprises a flexible tether. The tether comprises a cord member and a clip member. A first end of the cord member is fixedly secured to the lighting device and an opposite end of the cord member secured to the clip member. At least one of the frame and the back cover comprises one or more attachment mechanisms configured to mount the lighting device within a mounting bracket.

According to yet another aspect of the present invention, a lighting kit for installing a lighting fixture is provided. In example embodiments, the lighting kit comprises a lighting device and a mounting bracket. In example embodiments, the lighting device comprises a front cover, a back cover, and a frame having an interior edge. The interior edge is in contact with a perimeter of the front cover and a perimeter of the back cover. The front cover, the back cover, and the frame define an interior of the lighting device. The lighting device further comprises a flexible tether. The tether comprises a cord member and a clip member. A first end of the cord member is fixedly secured to the lighting device and an opposite end of the cord member is secured to the clip member. At least one of the frame and the back cover comprises one or more attachment mechanisms. In example embodiments, the mounting bracket comprises a junction box mounting element configured for securing the lighting fixture to a junction box, one or more attachment mechanism mating elements configured to mate with the one or more attachment mechanisms when the lighting device is rotated within the mounting bracket to secure the lighting device into the mounting bracket, and a receiving member configured to secure the tether to the mounting bracket by the clip.

According to still another aspect of the present invention, a mounting bracket for flush mounting a lighting device is provided. In example embodiments, the mounting bracket comprises a first element and a second element. The first element comprises a first planar member, one or two first transverse members disposed at opposite ends of the first planar member, and one or two first attachment mechanism mating elements each disposed on an end of one of the one or two first transverse members opposite the first planar member. The second element comprises a second planar member, one or two second transverse members, and one or two second attachment mechanism mating elements each disposed on an end of one of the one or two second transverse members opposite the second planar member. The first element is secured to the second element such that a first plane defined by the first planar member is generally parallel with a second plane defined by the second planar member and a first major axis defined by the first planar member is askew with respect to a second major axis defined by the second planar member. The one or two first attachment mechanism mating elements and the one or two second attachment mechanism mating elements are configured to rotatably mate with corresponding attachment mechanisms disposed on the lighting device to secure the lighting device to the mounting bracket.

According to yet another aspect of the present invention, a lighting kit for installing a lighting fixture is provided. In an example embodiment, the lighting kit comprises a lighting device and a mounting bracket. In example embodiments, the lighting device comprises a front cover, a back cover, and a frame having an interior edge. The interior edge is in contact with a perimeter of the front cover and a perimeter of the back cover. The front cover, the back cover, and the frame define an interior of the lighting device. At least one of the frame and the back cover comprises one or more attachment mechanisms. In example embodiments, the mounting bracket comprises a first element and a second element. The first element comprises a first planar member, one or two first transverse members disposed at opposite ends of the first planar member, and one or two first attachment mechanism mating elements each disposed on an end of one of the one or two first transverse members opposite the first planar member. The second element comprises a second planar member, one or two second transverse members, and one or two second attachment mechanism mating elements each disposed on an end of one of the one or two second transverse members opposite the second planar member. The first element is secured to the second element such that a first plane defined by the first planar member is generally parallel with a second plane defined by the second planar member and a first major axis defined by the first planar member is askew with respect to a second major axis defined by the second planar member. The one or two first attachment mechanism mating elements and the one or two second attachment mechanism mating elements are configured to rotatably mate with corresponding ones of the one or more attachment mechanisms disposed on the lighting device to secure the lighting device to the mounting bracket.

BRIEF DESCRIPTION OF THE SEVERAL VIEWS OF THE DRAWING(S)

Having thus described various embodiments of the invention in general terms, reference will now be made to the accompanying drawings, which are not necessarily drawn to scale, and wherein:

DETAILED DESCRIPTION

Figure 1:
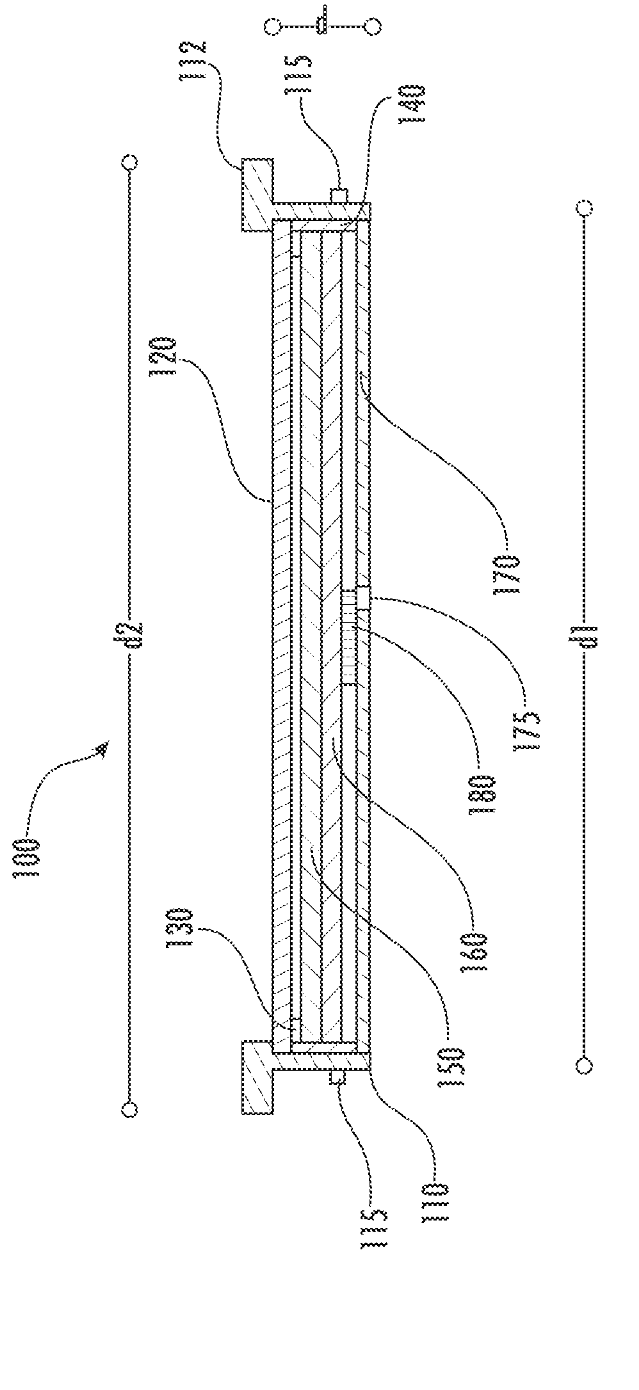
FIG. 1 is a cross-sectional view of an LED flat panel lighting device, in accordance with an embodiment of the present invention.

Various embodiments of the present invention now will be described more fully hereinafter with reference to the accompanying drawings, in which some, but not all embodiments are shown. Indeed, the invention may be embodied in many different forms and should not be construed as limited to the various embodiments set forth herein; rather, the embodiments described herein are provided so that this disclosure will satisfy applicable legal requirements. Like numbers refer to like elements throughout.

Various embodiments of the present invention provide an LED lighting fixture 1 (see FIGS. 3-10 and 12-15) configured to be flush mounted. In example embodiments, LED lighting fixture 1 comprises a lighting device 100 and a mounting bracket 200, 200'. In example embodiments, the lighting device 100 is a light emitting diode (LED) flat panel lighting device. The LED flat panel lighting device 100 comprises at least one attachment mechanism 115. The mounting bracket 200 comprises at least one attachment mechanism mate 215 configured to mate with the one or more attachment mechanisms 115 of the LED flat panel lighting device 100 and thereby secure the LED flat panel lighting device 100 into the mounting bracket 200, 200'. Elements of various embodiments of the present invention will now be described in more detail herein.

I. LED Flat Panel Lighting Device 100

FIG. 1 shows a cross-sectional view an LED flat panel lighting device 100. The LED flat panel lighting device 100 may include at least one LED package 130. In various embodiments, the at least one LED package 130 is mounted on a ring 140. The at least one LED may be mounted on the ring 140 such that the light emitted by the at least one LED package 130 is directed toward the center of the ring 140. The LED flat panel lighting device 100 may include a light guide 150. The light guide 150 may be configured to direct light emitted by the at least one LED package 130 toward the front cover 120. In various embodiments, the LED flat panel lighting device 100 may also include a reflector 160 disposed behind the light guide 150, a back cover 170 disposed behind the light guide 150, and/or driver circuitry 180. The reflector 160 may be configured to reflect light toward the front cover 120. The back cover 170 may be configured to seal the LED flat panel lighting device 100 from dirt and/or moisture, provide structural support to the LED flat panel lighting device 100, enclose the electrical components (e.g., the at least one LED package 130 and/or the driver circuitry 180) of the LED flat panel lighting device 100, and/or the like. In various embodiments, the LED flat panel lighting device 100 may also include a driver circuitry protective cover configured to enclose and/or protect the driver circuitry 180. In various embodiments, the ring 140 and/or reflector 160 may be configured to act as a heat sink for the electrical components (e.g., the at least one LED package 130 and/or the driver circuitry 180) of the LED flat panel lighting device 100. In various embodiments, the frame 110 may also act as the ring 140. In example embodiments, the LED flat panel lighting device 100 may further comprise a tether 195 configured to suspend the LED flat panel lighting device 100 therefrom.

In various embodiments, the LED flat panel lighting device 100 may be square, rectangular, circular, polygonal, and/or have any of a variety of other, even possibly irregular, shapes. In various embodiments, the shape of ring 140 may have approximately the same shape as the LED flat panel lighting device 100. The LED flat panel lighting device 100 may be configured to be thin. For example, the thickness of the LED flat panel lighting device 100 may be approximately half an inch to one inch, or smaller. In some embodiments, the thickness of the LED flat panel lighting device 100 is approximately the same thickness as an average piece of dry wall or other wall covering material (e.g., shiplap, paneling, etc.). For example, the thickness of the LED flat panel lighting device 100 may be approximately three-eighths to five-eighths of an inch. In another embodiment, the thickness of the LED flat panel lighting device 100 may be approximately three-quarters of an inch. In some embodiments, the thickness of the LED flat panel lighting device 100 may be between one and two inches. The LED flat panel lighting device 100 may be configured such that the LED flat panel lighting device 100 may be flush mounted to a junction box 500 (see e.g., FIGS. 3, 4, and 7). For example, the LED flat panel lighting device 100 may be configured to be flush mounted to a junction box by being secured into a mounting bracket secured to junction box.

A. Frame 110

The frame 110 is configured to provide structural support to the LED flat panel lighting device 100. In various embodiments, the frame 110 may be configured to enclose the edges of the LED flat panel lighting device 100 and/or define the outside perimeter of the LED flat panel lighting device 100. For example, an inner edge of the frame 110 may be in contact with the perimeter of the front cover 120 and the perimeter of the back cover 170 and may act to enclose the space between the front cover 120 and the back cover 170. In another embodiment, the perimeter of the front cover 120 may be enclosed within frame 110, such that the perimeter of the front cover 120 is not visible to a user. In an example embodiment, the frame 110 and the back cover 170 may be integrally formed.

In various embodiments, an external edge of the frame 110 may include a lip 112 configured to allow the LED flat panel lighting device 100 to be mounted flush within the mounting bracket while providing an aesthetically pleasing finish. For example, the external edge of the frame 110 may define two diameters, a first diameter d1 around the back of the frame 110 and a second diameter d2 around the front of the frame 110. The second diameter may be larger than first diameter (d2>d1). In various embodiments, the second diameter d2 is approximately a quarter of an inch to an inch larger than the first diameter d1.

Figure 2:
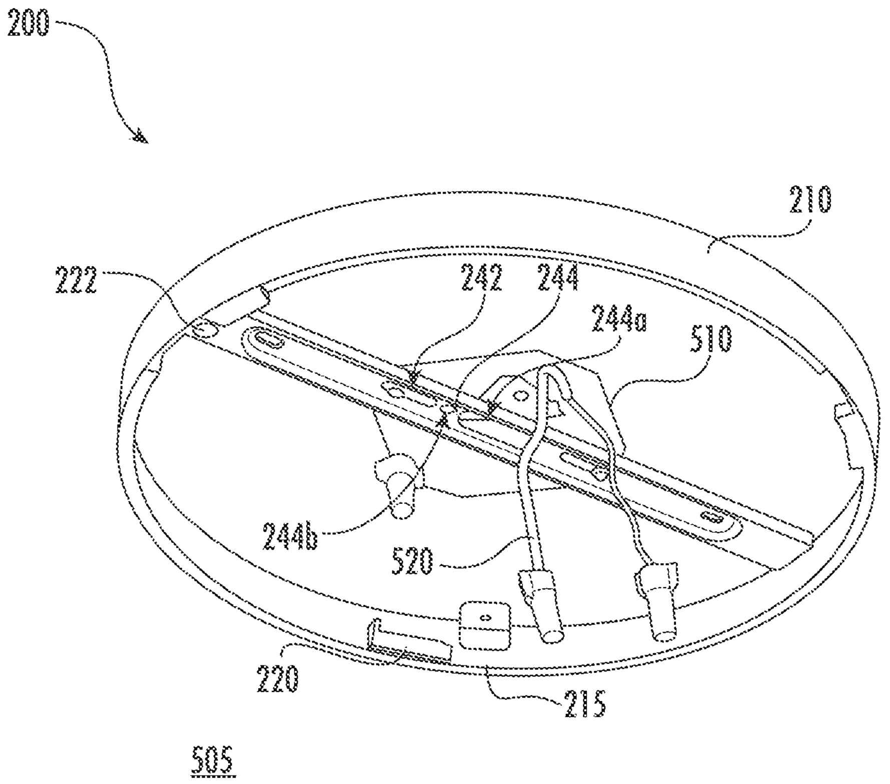
FIG. 2 is a perspective view of a mounting bracket secured to a mounting surface, in accordance with example embodiments.
Figure 11A:
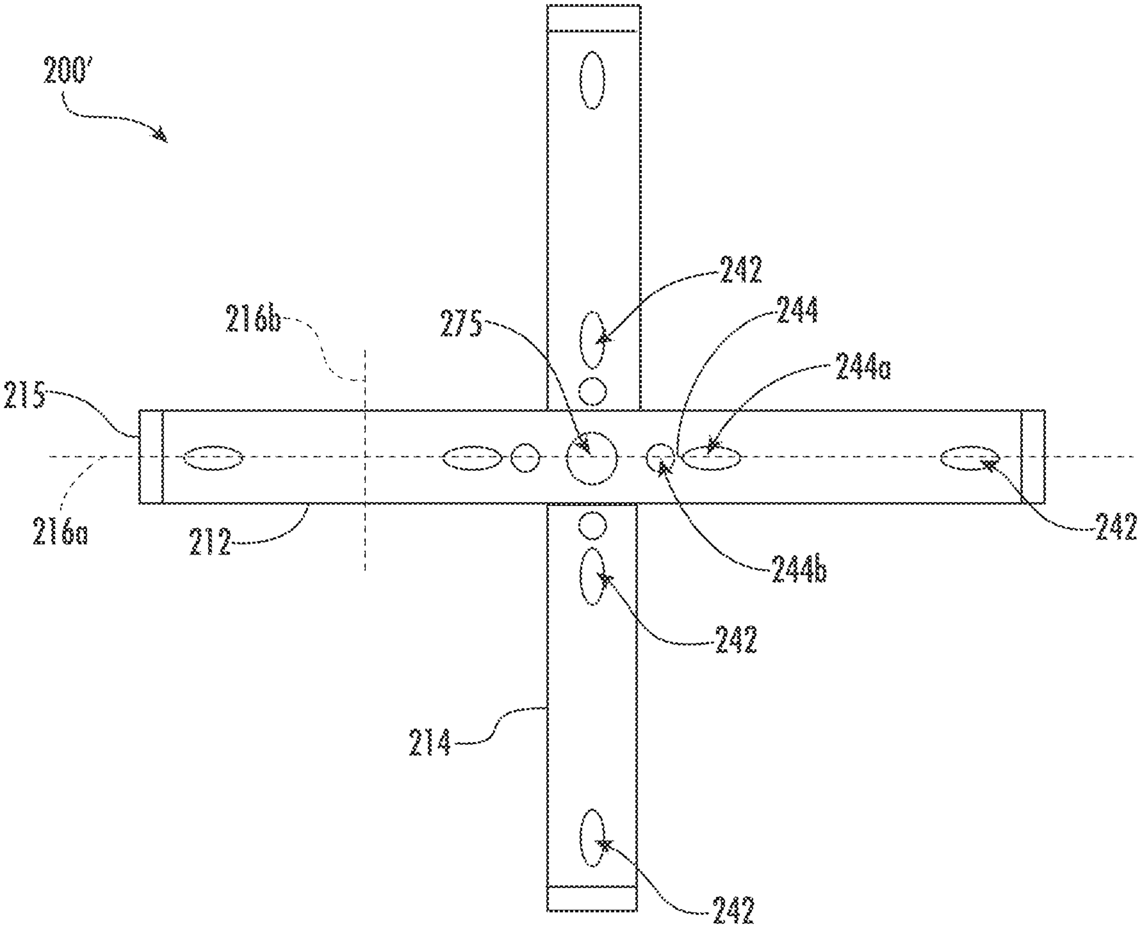
FIG. 11A is top view of an example mounting bracket, in accordance with an embodiment of the present invention.
Figure 11B:
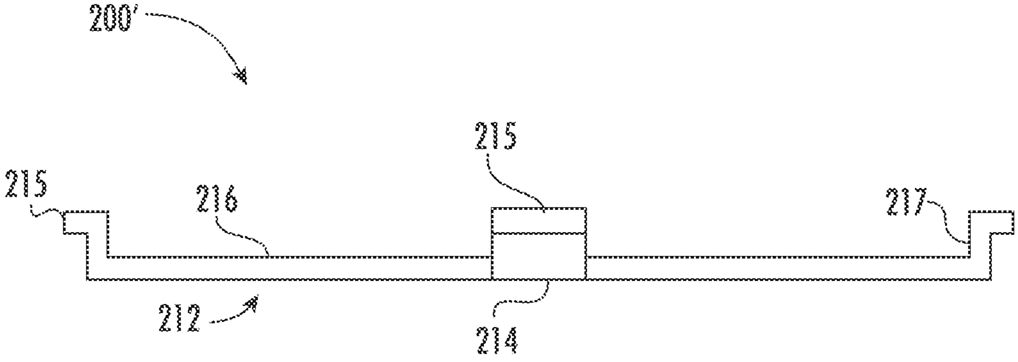
FIG. 11B is a side view of the example mounting bracket shown in FIG. 11A.
Figure 13:
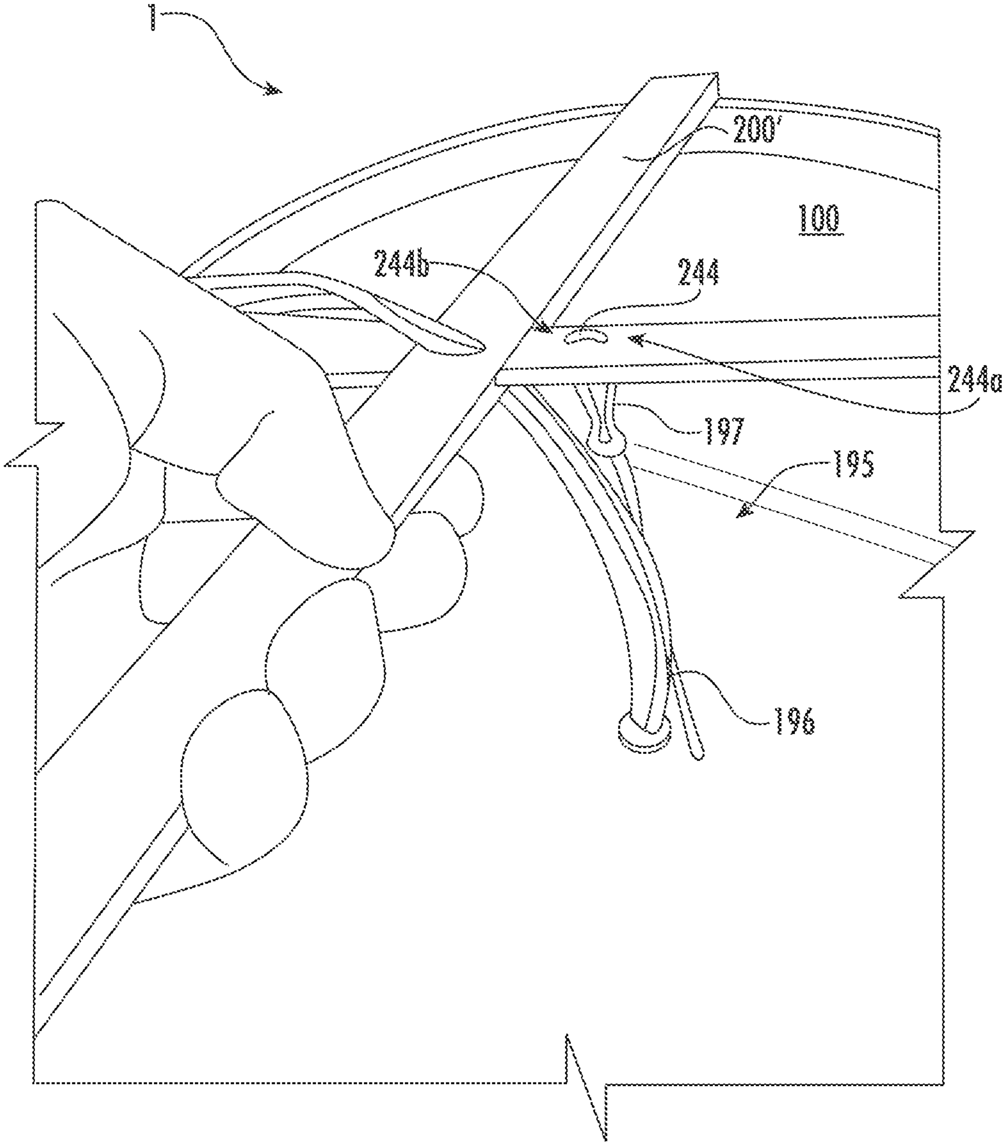
FIG. 13 is a perspective view of a flat panel lighting device attached to a T-bar mounting bracket by a tether, in accordance with an embodiment of the present invention.
Figure 14:
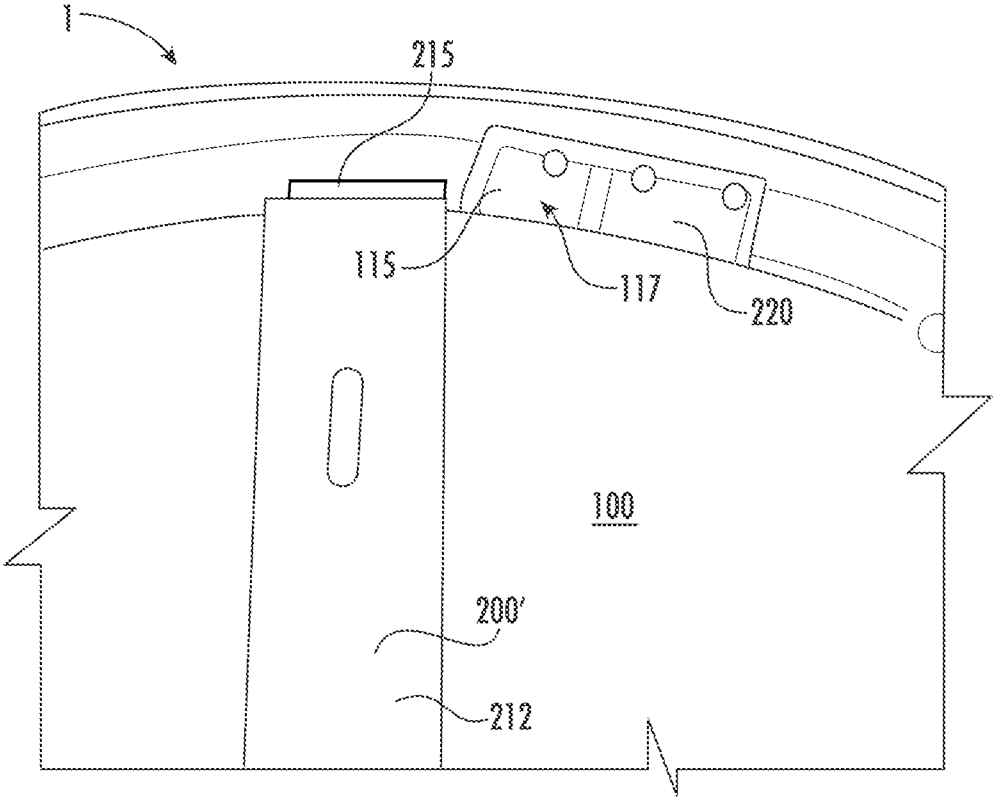
FIG. 14 is a close up perspective view of an example attachment mechanism and attachment mechanism mate, in accordance with an example embodiment of the present invention.
Figure 15:
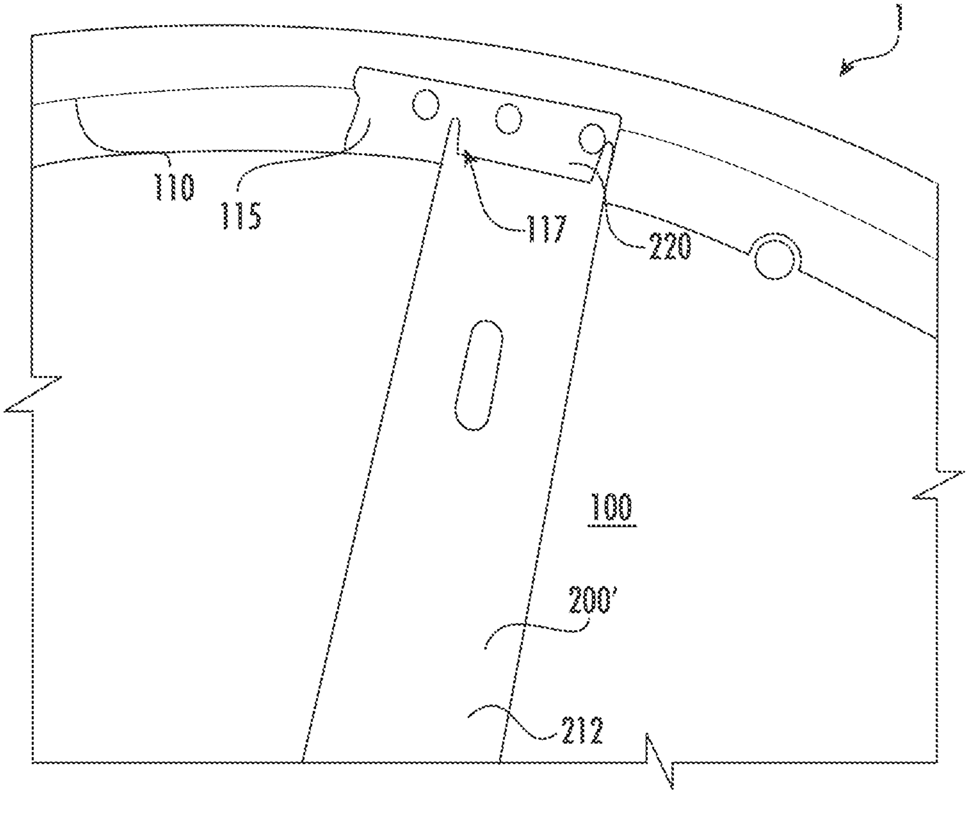
FIG. 15 is a close up perspective view of the example attachment mechanism and attachment mechanism of FIG. 14 in a mated position, in accordance with an example embodiment of the present invention.

In various embodiments, the frame 110 may be configured to secure the LED flat panel lighting device 100 to a mounting frame 200 or 200' (shown in FIGS. 2, 11A, and 11B). For example, the LED flat panel lighting device 100 may comprise one or more attachment mechanisms 115 configured to be mated with one or more attachment mechanism mating elements (e.g., attachment mechanism mates 215 shown in FIGS. 2-6, 11A, 11B, and 14 and described in more detail below) of the mounting bracket 200, 200'. For example, the frame 110 may comprise attachment mechanism 115 configured to secure the LED flat panel lighting device 100 into the mounting frame 200, 200'. In various embodiments, the frame 110 may comprise one or more attachment mechanisms 115. In a particular embodiment, the frame 110 may comprise three or four attachment mechanisms 115 equally spaced around the exterior of the frame 110. In various embodiments the attachment mechanisms 115 may extend outwardly from the exterior of the frame 110. For example, the attachment mechanisms 115 may be knobs, t-posts, tabs, and/or the like configured to be secured into a corresponding notch on the mounting bracket 200, 200'. In another example, the attachment mechanisms 115 may be a notch or other receiving element configured to receive, retain, and/or lock a knob, t-post, tab, and/or the like therein. As shown in FIGS. 14 and 15, in embodiments, wherein the attachment mechanism 115 is a notch or other receiving element, the frame 110 may further comprise one or more locking mechanisms 220 configured to lock and/or retain a knob, t-post, tab and/or the like therein. For example, as shown in FIGS. 13 and 14, a notch and locking mechanism may be formed by securing receiving envelope 117 to the frame 110 using, for example, fasteners, rivets, adhesive, and/or the like. In example embodiments, the one or more attachment mechanisms 115 may be disposed on the back cover 170 of the LED flat panel lighting device 100 rather than and/or in addition to being disposed on the frame 110.

In various embodiments, the frame 110 may be made from a polymerized material, metal (e.g., aluminum, and/or the like), as commonly known and understood in the art. In certain embodiments, the frame 110 may be made of plastic or any of a variety of (or combination of) other appropriate materials. In various embodiments, the frame 110 may be approximately one inch thick or thinner. In some embodiments, the frame 110 may be one to one and a half inches thick. In other embodiments, the frame 110 may be thicker than one and a half inches.

As discussed elsewhere herein, the LED flat panel lighting device 100 may have any shape. In some embodiments, the shape of the LED flat panel lighting device 100 may be determined at least in part by the frame 110. For example, the front of the frame 110 (e.g., the portion of the frame 110 adjacent the front cover 120) may be round, square, rectangular, polygonal, elliptical, or irregular. The back of the frame 110 (e.g., the portion of the frame 110 adjacent the back cover 170), may be round or a shape different from the front of the frame 110. For example, the front of the frame 110 may be configured to provide an aesthetically pleasing and/or interesting appearance and the back portion of the frame may be configured for easily securing the LED flat panel lighting device 100 into the mounting bracket 200, 200'.

B. Front Cover 120

The front cover 120 may be configured such that at least some portion of the light emitted by the at least one LED package 130 can pass through the front cover 120. For example, the front cover 120 may be transparent, translucent, or semi-translucent. For example, in various embodiments, the front cover 120 may be configured such that at least 10% of the light emitted by the at least one LED package 130 can pass through the front cover 120. In some embodiments, the front cover 120 may be configured such that a significant fraction of the light emitted by the at least one LED package 130 can pass through the front cover 120. For example, in certain various embodiments, the front cover 120 may be configured to permit 10-30%, 30-50%, or 60-80% of the light emitted by the at least one LED package 130 and incident upon the front cover 120 to pass through the front cover 120. In some embodiments, the front cover 120 may be configured to permit at least 50% of the light emitted by the at least one LED package 130 to pass through the front cover 120. In certain embodiments, the front cover 120 may be configured such that substantially all of the light emitted by the at least one LED package 130 and incident on the front cover 120 may pass through the front cover 120. For example, in some embodiments, the front cover 120 may be configured to permit more than 80%, or in certain embodiments, more than 90%, of the light emitted by the at least one LED package 130 and incident upon the front cover 120 to pass through front cover 120.

In various embodiments, the front cover 120 may be made from a polymerized material, glass, alabaster, and/or the like, as commonly known and understood in the art. In certain embodiments, the front cover 120 may be made of plastic. In some embodiments, the front cover 120 may be made of an opaque material; however, in other embodiments, the front cover 120 may be made of any of a variety of translucent or semi-translucent materials, as may be commonly known and used in the art. Still further, according to other embodiments, the front cover 120 may be clear or frosted. In at least one embodiment, the front cover 120 may be made of Smart Glass, or some other material that can transition from clear to frosted and/or vice versa. In yet other embodiments, the front cover 120 may be tinted with various colors. For example, in at least one embodiment, the front cover 120 may be tinted blue to give the light emitted by the LED lighting fixture 1 a blue glow. Indeed, it should be understood that the front cover 120 may be made from any of a variety of materials, as may be commonly known and used and readily available in the art, provided such possess the light transmission characteristics that are desirable for particular applications.

In various embodiments, the translucent or semi-translucent material may permit passage of at least some portion of the light emitted by the at least one LED package 130 and incident upon the front cover 120 to pass through the front cover 120. In certain embodiments, the translucent or semi-translucent material may allow passage of at least 10% of the light emitted by the at least one LED package 130 to pass through the front cover 120. In at least one embodiment, the translucent or semi-translucent material may permit passage of 10-30% of the light emitted by the at least one LED package 130 and incident upon the cover to pass through the front cover 120. In other certain embodiments, the translucent or semi-translucent material may be configured to permit passage of 30-50% of the light emitted by the at least one LED package 130 to pass through the front cover 120. In still other embodiments the translucent or semi-translucent material may permit passage of more than 50%, or, in certain various embodiments, more than 80%, of the light emitted by the at least one LED package 130 to pass through front cover 120. Alternatively, the translucent or semi-translucent material may permit passage of 60-80% of the light emitted by at least one LED package 130 to pass through the front cover 120. Indeed, it should be understood that according to various embodiments, the front cover 120 may be configured to permit at least some desired portion of the light emitted by the at least one LED package 130 and incident upon the front cover 120 to pass through the front cover 120, however as may be beneficial for particular applications.

Figure 5:
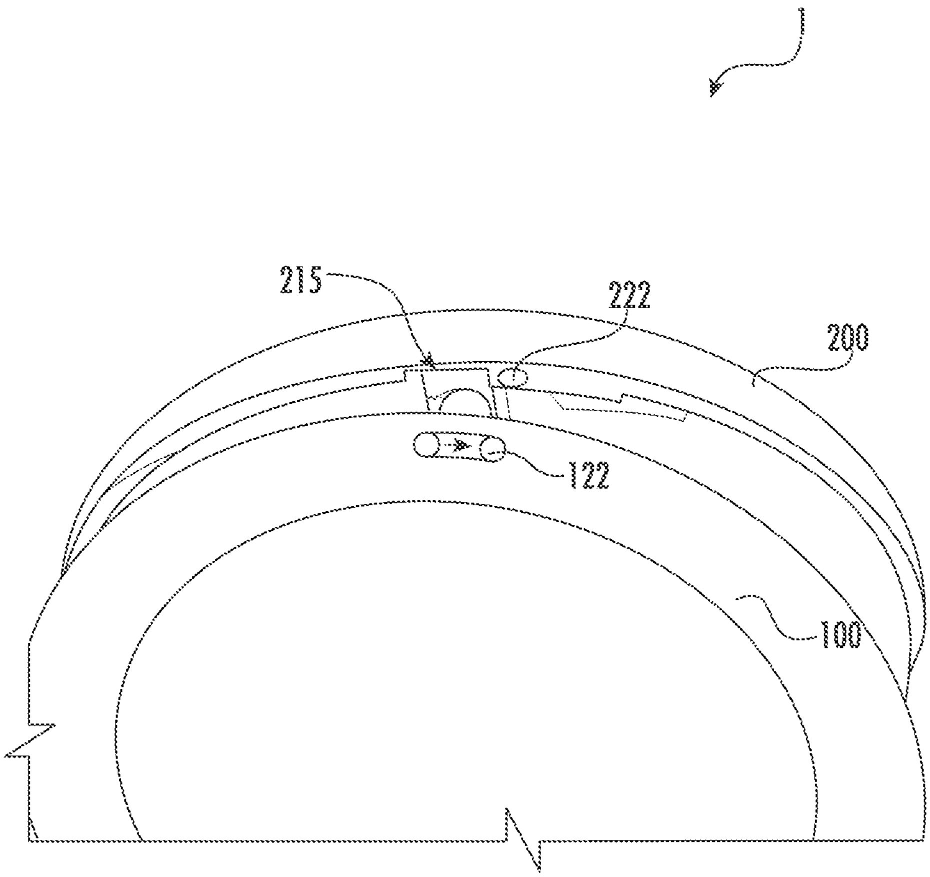
FIG. 5 is a perspective view of aligning an LED flat panel lighting device with a mounting bracket, in accordance with an embodiment of the present invention.

In example embodiments, the front cover 120 may comprise an alignment guide 122 (see FIG. 5). In example embodiments, the alignment guide 122 is configured to aid a user in aligning one or more attachment mechanisms 115 with one or more attachment mechanism mates (or mating elements) of the mounting bracket 200, 200'. As discussed in more detail herein the one or more attachment mechanism mates of the mounting bracket 200, 200' may be configured to receive an attachment mechanism 115 therein (or vice versa). The LED flat panel lighting device 100 and the mounting bracket 200, 200' may then be rotated with respect to one another to lock the attachment mechanisms 115 into the corresponding attachment mechanism mates of the mounting bracket 200, 200'. The alignment guide 122 may further indicate a direction in which the LED flat panel lighting device 100 should be rotated, with respect to the mounting bracket 200, 200' to cause the LED flat panel lighting device 100 to be secured into the mounting bracket 200, 200'. In example embodiments, the alignment guide 122 may indicate the degree of rotation the LED flat panel lighting device 100 should be rotated, with respect to the mounting bracket 200, 200' to fully secure, lock, and/or the like the LED flat panel lighting device 100 into the mounting bracket 200, 200'. In example embodiments, the alignment guide 122 may be a removable sticker that is attached to the cover 120 (or frame 110), by an adhesive, static cling, and/or the like. For example, the alignment guide 122 may be removed after the LED lighting fixture 1 is installed (e.g., after the LED flat panel lighting device 100 is secured into the mounting bracket 200, 200').

C. Light Emitting Diode (LED) Package 130

As shown in FIG. 1 the LED flat panel lighting device 100 also comprises at least one light emitting diode (LED) package 130. In example embodiments, an LED package 130 comprises one or more LED chips, electrical contacts, and optionally phosphor (e.g., to cause the LED package to emit white light). The LED package 130 may further comprise encapsulant to protect the one or more LED chips, wire bonds, and the phosphor. In some embodiments, the LED package 130 may further comprise one or more optical elements. In embodiments having more than one LED package, the LED packages 130 may have different wattages and/or different color temperatures. In various embodiments, the LED flat panel lighting device 100 is an edge-lit panel. For example, the one or more LED packages 130 may be secured along the inside perimeter of the LED flat panel lighting device 100 (e.g., along the inner edge of ring 140) such that the light emitted by the one or more LED packages 130 is emitted toward the middle of the ring 140. Also, various embodiments of the LED flat panel lighting device 100 may employ LED packages 130 that emit different levels of illumination at different color temperatures. The number of LED packages 130 used may also be utilized to determine the level of illumination emitted by the LED flat panel lighting device 100.

D. Driver Circuitry 180

As illustrated in FIG. 1, driver circuitry 180 is disposed within the LED flat panel lighting device 100. In example embodiments, the driver circuitry 180 is configured to provide a controllable current to the one or more LED packages 130. In various embodiments, the driver circuitry 180 may comprise a circuit portion configured to convert the input alternating current (AC) line voltage to a direct current (DC) voltage. In various embodiments, the driver circuitry 180 may comprise a circuit portion configured to control the current being applied to the one or more LED packages 130. The driver circuitry 180, in various embodiments, may further comprise a circuit portion configured to allow a user to adjust the brightness of the light emitted from the LED flat panel lighting device 100 through the use of a dimmer switch. These circuitry portions are commonly known and understood in the art, and thus will not be described in detail herein. In various embodiments, the driver circuitry 180 may include other circuitry portions and/or the circuitry portions described herein may not be distinct circuitry portions. For example, in some embodiments, the circuitry portion that converts the AC line voltage to a DC voltage may also control the current being applied to the one or more LED packages 130.

In various embodiments, the driver circuitry 180 is disposed within the chamber defined by the back cover 170 and the reflector 160. In some embodiments, the driver circuitry may be mounted on the back cover 170. In other embodiments, the driver circuitry may be mounted on the reflector 160. In certain embodiments, some components of the driver circuitry 180 may be mounted to the reflector 160 while other components of the driver circuitry 180 may be mounted to the back cover 170.

In various embodiments, the LED flat panel lighting device 100 comprises a driver circuitry protective cover. The driver circuitry protective cover may be configured to enclose at least a portion of the driver circuitry 180. For example, the driver circuitry protective cover may be configured to seal the driver circuitry 180 from dust, dirt, moisture and/or the like. In some embodiments, the LED flat panel lighting device 100 may comprise a driver circuitry protective cover 185 in addition to and/or in place of a back cover 170.

E. Light Guide 150

In various embodiments, the LED flat panel lighting device 100 may comprise a light guide 150. In various embodiments, the light guide 150 may be configured to direct the light emitted by the one or more LED packages 130 toward the front cover 120. For example, the light emitted by the one or more LED packages 130 may travel through the light guide 150 until reaching a particular point wherein the light guide 150 directs at least a portion of the light (e.g., via scattering, diffraction, internal reflection, and/or the like) toward the front cover 120. In various embodiments, a reflector 160 may be positioned behind the light guide 150 such that light directed away from the front cover 120 may be reflected back toward the front cover 120. A variety of light guides are known and understood in the art and may be employed herein for various applications. In example embodiments, the light guide 150 may comprise various secondary optics for conditioning the light emitted by the one or more LED packages 130 before the light is emitted from the LED flat panel lighting device 100. In various embodiments, the light guide 150 may be made of polymeric material as is known in the art, glass, and/or other translucent and/or partially translucent material, as appropriate for the application.

F. Back Cover 170

In various embodiments, the LED flat panel lighting device 100 may comprise a back cover 170. The back cover 170 may be configured to seal the interior of the LED flat panel lighting device 100 from dust, dirt, moisture and/or the like; enclose the electrical components (e.g., the at least one LED package 130 and/or the driver circuitry 180) of the LED flat panel lighting device 100; provide structural support for the LED flat panel lighting device 100; and/or the like. In some embodiments, the back cover 170 may comprise wire conduit 175. The wire conduit 175 may be a hole or passage through the back cover such that a wire carrying line voltage may be connected to the driver circuitry 180 and/or other electrical component of LED flat panel lighting device 100. For example, in one embodiment, connecting wires 190 (e.g., see FIGS. 3 and 4) may be connected to the driver circuitry 180 and pass through the wire conduit 175 such that the connecting wires 190 may be connected to line voltage wires 520 (see FIG. 2). In various embodiments, the wire conduit 175 may be configured to provide a seal around the connecting wires 190 to prevent dust, dirt, and/or moisture from entering the interior of the LED flat panel lighting device 100. In various embodiments, electrical connecting wires 190 may be secured to the driver circuitry 180 or other electrical component of the LED flat panel lighting device 100. The electrical connecting wires 190 may pass through the wire conduit 175 and be configured to connect the electrical components (e.g., driver circuitry 180, the at least one LED package 130, and/or the like) of the LED flat panel lighting device 100 with line voltage and/or other electrical power.

In example embodiments, a tether 195 may pass through the back cover 170. For example, component configured to retract at least a portion of the tether 195 and/or to secure a first end of the tether 195 may be positioned between the back cover 170 and the reflector 160. The first end of the tether 195 may be securely affixed to the LED flat panel lighting device 100.

In example embodiments, the back cover 170 may comprise one or more attachment mechanisms 115 configured to secure the LED flat panel lighting device 100 into the mounting frame 200, 200'. In various embodiments, the frame 110 may comprise one or more attachment mechanisms 115. In a particular embodiment, the frame 110 may comprise three or four attachment mechanisms 115 equally spaced around the exterior of the frame 110. In various embodiments the attachment mechanisms 115 may extend outwardly from the exterior of the frame 110. For example, the attachment mechanisms 115 may be knobs, t-posts, tabs, and/or the like configured to be secured into a corresponding notch on the mounting bracket 200, 200'. In another example, the attachment mechanisms 115 may be a notch or other receiving element configured to receive, retain, and/or lock a knob, t-post, tab, and/or the like therein. As shown in FIGS. 14 and 15, in embodiments, wherein the attachment mechanism 115 is a notch or other receiving element, the frame 110 may further comprise one or more locking mechanisms 220 configured to lock and/or retain a knob, t-post, tab and/or the like therein. For example, as shown in FIGS. 13 and 14, a notch and locking mechanism may be formed by securing receiving envelope 117 to the back cover 170 using, for example, fasteners, rivets, adhesive, and/or the like. As should be understood, the LED flat panel lighting device 100 described herein provides various examples of LED flat panel lights that may be mounted via the various methods described herein.

G. Tether 195

Figure 3:
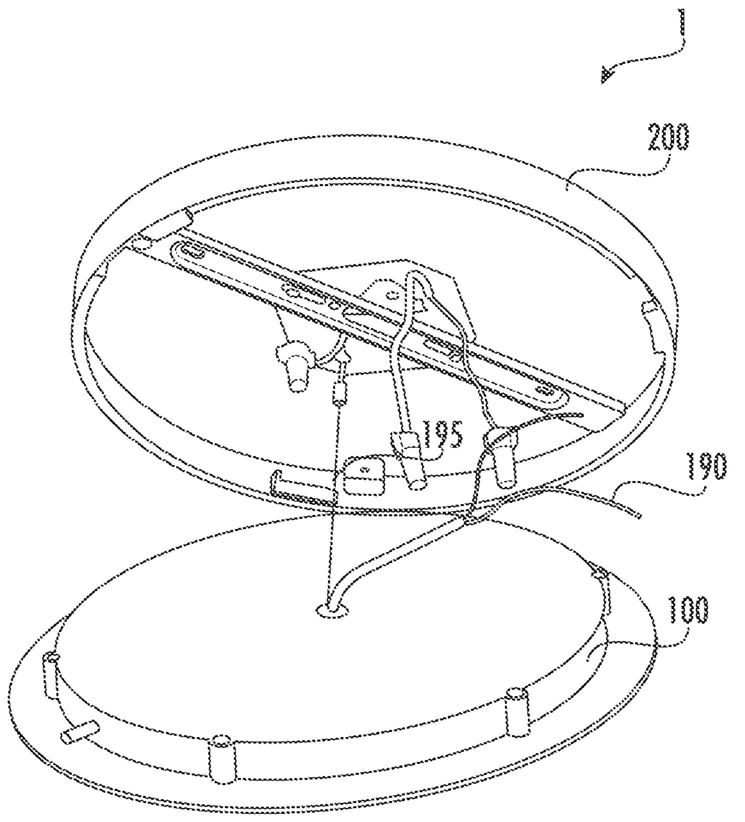
FIG. 3 is a perspective view of an example LED flat panel lighting device suspended from a mounting bracket by a tether, in accordance with an example embodiment of the present invention.
Figure 4:
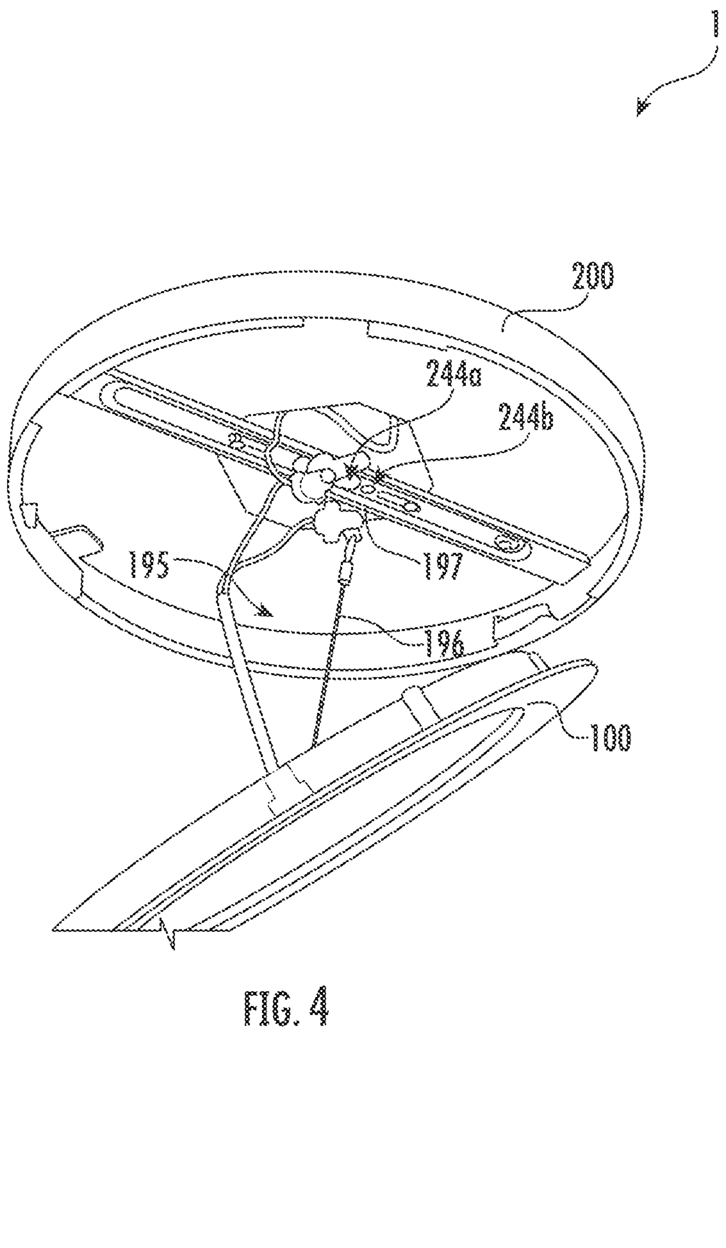
FIG. 4 is another perspective view of an example LED flat panel lighting device suspended from a mounting bracket by a tether, in accordance with an example embodiment of the present invention.

As shown in FIGS. 3, 4, and 13, an LED flat panel lighting device 100 may comprise a tether 195. In example embodiments, a tether comprises a cord member 196 and a clip member 197. In example embodiments, the cord member 196 comprises a length of wire, string, cording, cable, and/or other flexible material having appropriate tensile strength. For example, the cord member 196 may comprise a length of braided, twisted, and/or coated aluminum or steel cable. In example embodiments, the cord member 196 may be flexible, thereby providing a flexible tether 195. In example embodiments, the cord member 196 and/or the tether 195 may stretchable. In example embodiments, the cord member 196 and/or the tether 195 may be spring-loaded. In example embodiments the maximum length that the cord member 196 may extend out from the back cover 170 approximately six inches (e.g., within manufacturing constraints of six inches). In other embodiments, the maximum length that the cord member 196 may extend out from the back cover 170 six inches to one foot. In example embodiments, the maximum length that the cord member 196 may extend out from the back cover 170 is half an inch to six inches. In an example embodiment, the tether 195 is between two and nine inches long. In particular, a first end of the cord member 196 may be secured, fastened, affixed, and/or the like within the LED flat panel lighting device 100 (e.g., between the back cover 170 and the reflector 160) or to the back cover 170. In some embodiments, the cord member 196 is secured, fastened, affixed, and/or the like to the LED flat panel lighting device 100 by a retracting element that is secured, fastened, affixed, and/or the like to the LED flat panel lighting device 100. Thus, the length of the cord member 196 that extends out of the back cover 170 may be adjustable up to the maximum length. The clip member 197 may be configured such that the clip member 197 may not be retracted into the LED flat panel lighting device 100.

In example embodiments, a first end of the cord member 196 is securely fastened, affixed and/or the like to the LED flat panel lighting device 100. For example, the tether 195 may be securely fastened, affixed, and/or the like to a securing element and/or a retracting element disposed between the back cover 170 and the reflector 160 of the LED flat panel lighting device 100. For example, a retracting element disposed between the back cover 170 and the reflector 160 may be configured to retract at least a portion of the cord member 196 into the space between the back cover 170 and the reflector 160 when the tether 195 is not actively in use.

In example embodiments, a clip member 197 is secured, fastened, affixed and/or the like to a second end of the cord member 196 that is opposite the first end of the cord member 196. For example, the second end of the cord member 196 may comprise a loop that loops through the clip member 197, thereby securing the clip member 197 to the cord member 196. The clip member 197 may be configured to be clipped onto, attached to, and/or the like a receiving member 244 of the mounting bracket 200, 200'. In example embodiments, the clip member 197 may be made of metal (e.g., aluminum, steel, and/or the like), a polymeric material (e.g., plastic), or other material having appropriate tensile strength. In example embodiments, the clip member 197 may be configured to be connected to the receiving member 244 of the mounting bracket 200, 200' after the mounting bracket is secured, fastened, affixed, and/or the like to a junction box and/or mounting surface such that the LED flat panel lighting device 100 may be suspended from the mounting bracket 200, 200' by the tether 195 while the electrical connections between the electrical connecting wires 190 and the line voltage wires 520 are made. In some embodiments, the clip member 197 may remain clipped onto, attached to, and/or the like the mounting bracket 200, 200' while the LED flat panel lighting device 100 is being secured into the mounting bracket 200, 200' and after installation of the LED flat panel lighting device 100 is completed. Thus, the clip member 197 is configured to fit within the space between the LED flat panel lighting device 100 (e.g., the back cover 170 thereof) and the mounting bracket 200, 200' and/or the mounting surface 505.

II. Mounting Bracket 200

FIG. 2 illustrates a mounting bracket 200 in accordance with an embodiment of the present invention. The illustrated mounting bracket is secured to a junction box 510 within a mounting surface 505. The mounting bracket 200 may be configured to be secured to the LED flat panel lighting device 100. For example, the illustrated mounting bracket 200 comprises a bracket frame 210 comprising attachment mechanism mates 215 (also referred to herein as attachment mechanism mating elements) for mating with the attachment mechanism(s) 115 for securing the LED flat panel lighting device 100 into the mounting bracket 200. For example, the attachment mechanisms 115 may be knobs, t-posts, tabs, and/or the like and the attachment mechanism mates 215 may comprise notches configured to receive a knob, t-post, tab, and/or the like therein. Such notches may be matched and/or aligned with locking mechanism 220 configured to retain the knob, t-post, tab, and/or the like secured to the mounting bracket 200. In another example, the attachment mechanisms 115 may be a notch or other receiving element and the one or more attachment mechanism mates 215 may be one or more knobs, t-posts, tabs, and/or the like configured to be received, retained, and/or locked into the attachment mechanism(s) 115. For example, the attachment mechanism mate 215 may be configured such that each attachment mechanism mate 215 may receive an attachment mechanism 115 therein; the mounting bracket 200 and the LED flat panel lighting device 100 may then be rotated with respect to each other such that each attachment mechanism 115 is secured to the mounting bracket 200 via the locking mechanism 220. For example, the locking mechanism 220 may be configured to retain an attachment mechanism 115 (e.g., a rounded portion of a knob, a free end of a t-post, a locking portion of a tab, and/or the like) therein. Of course, any of a variety of interlocking mechanisms may be incorporated, in part, as may be desirable for particular applications without departing from the spirit of the present invention.

The mounting bracket 200 may further comprise a junction mount 240. For example, the junction mount 240 may be secured to the mounting bracket 200 via screws, a twist and lock element, rivets, welding, and/or other securing mechanism. The junction mount 240 may be configured to flush mount the LED flat panel lighting device 100 to a junction box 510 located in a wall, ceiling, and/or other mounting surface 505. In example embodiments, the junction mount 240 may comprise one or more mounting holes 242 configured to receive a fastener there through to secure, mount, affix, and/or the like the junction mount 240 to the junction box 510 and/or mounting surface 505.

Figure 8B:
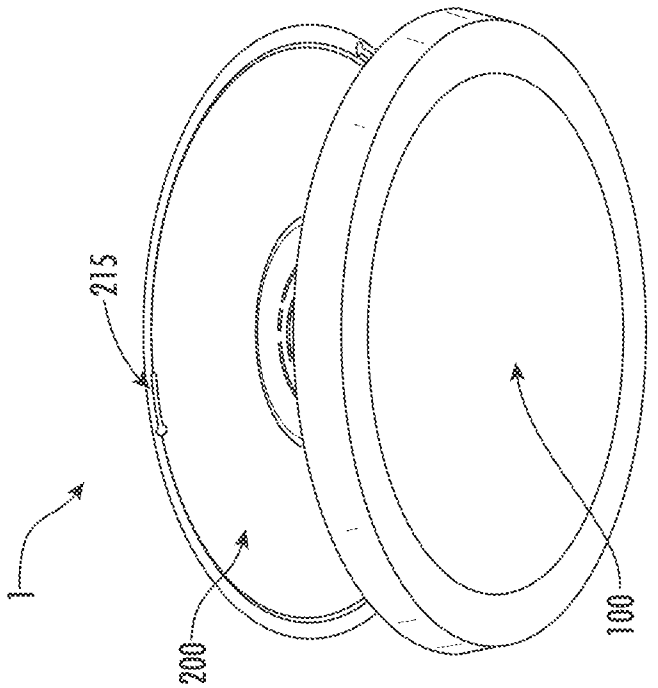
FIGS. 8A and 8B show different perspective views of an LED flat panel lighting device and corresponding mounting bracket, in accordance with an embodiment of the present invention.
Figure 8A:
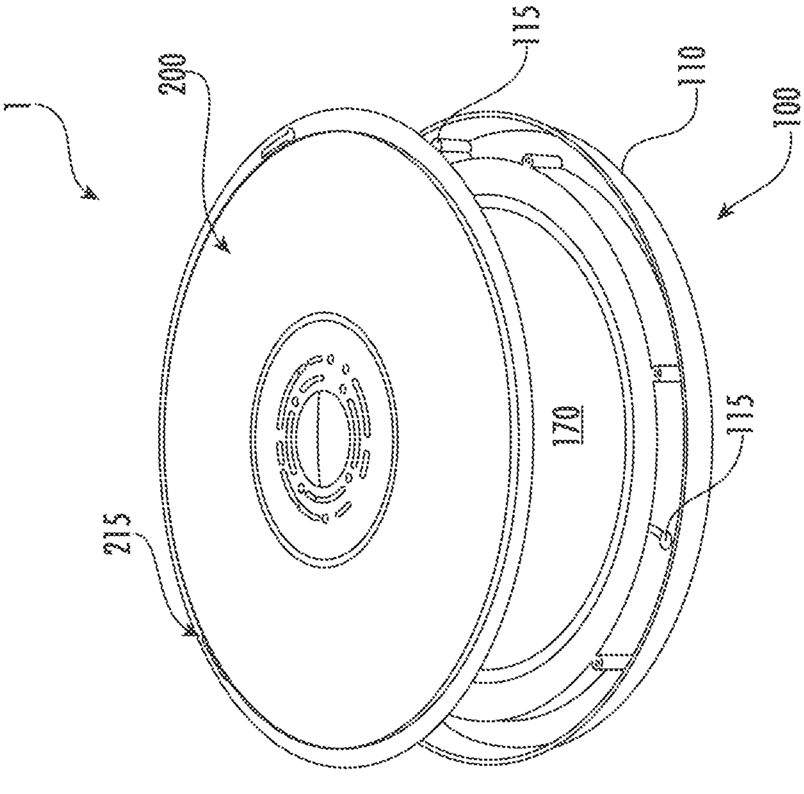
Figure 9:
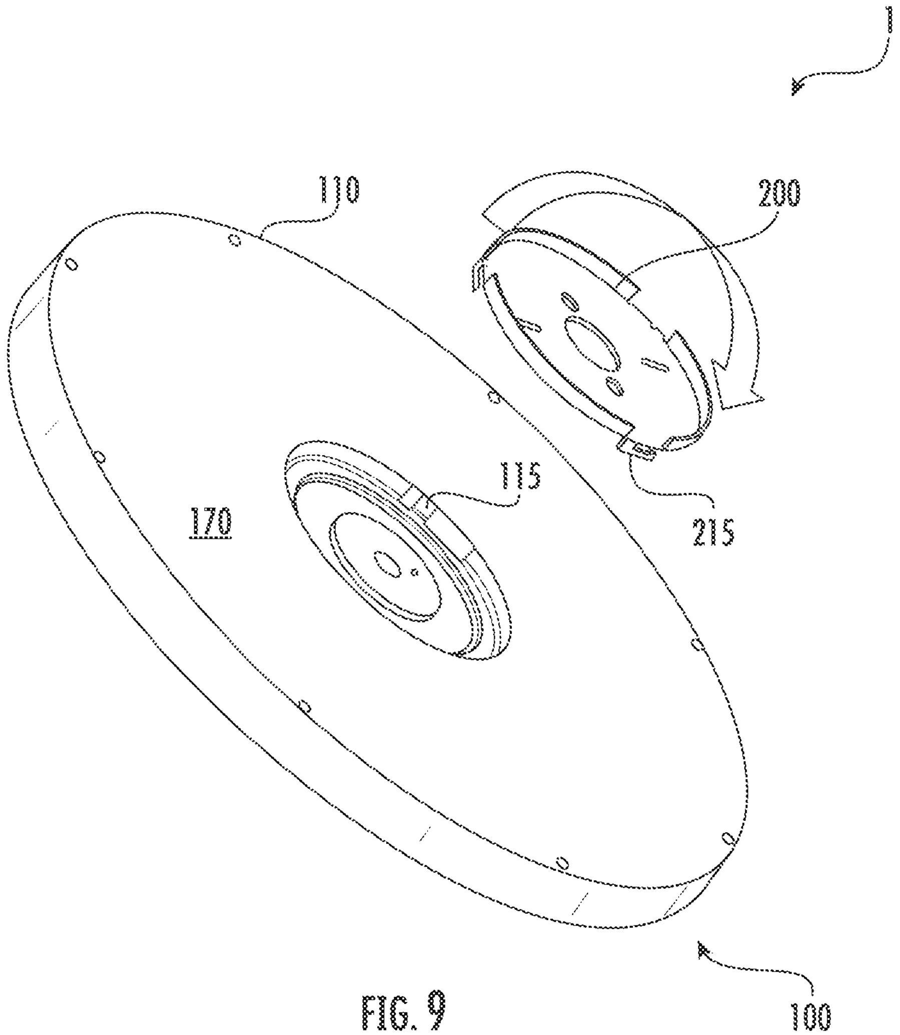
FIG. 9 is a perspective view of another embodiment of an LED flat panel lighting device and corresponding mounting bracket, in accordance with an embodiment of the present invention.

In example embodiments, the mounting bracket 200 may comprise an alignment guide 222. For example, the alignment guide 222 may be a marking, sticker, and/or the like on the mounting bracket 200 configured to aid the user in aligning the attachment mechanism(s) 115 with the corresponding attachment mechanism mate(s) 215. For example, the alignment guide 122 on the LED flat panel lighting device 100 may be visually aligned with the alignment guide 222 to place the attachment mechanism(s) 115 in appropriate alignment with the corresponding attachment mechanism mate(s) 215 such that the LED flat panel lighting device 100 may be rotated relative to the mounting bracket 200 to cause the attachment mechanism(s) 115 and the corresponding attachment mechanism mate(s) 215 to engage in a secure mating manner. FIGS. 8A, 8B, and 9 illustrate some example embodiments of LED flat panel lighting devices 100 having attachment mechanism(s) 115 configured to engage corresponding attachment mechanism mate(s) 215 to engage in a secure mating manner when the LED flat panel lighting device 100 is rotated relative to the mounting bracket 200.

Figure 10:
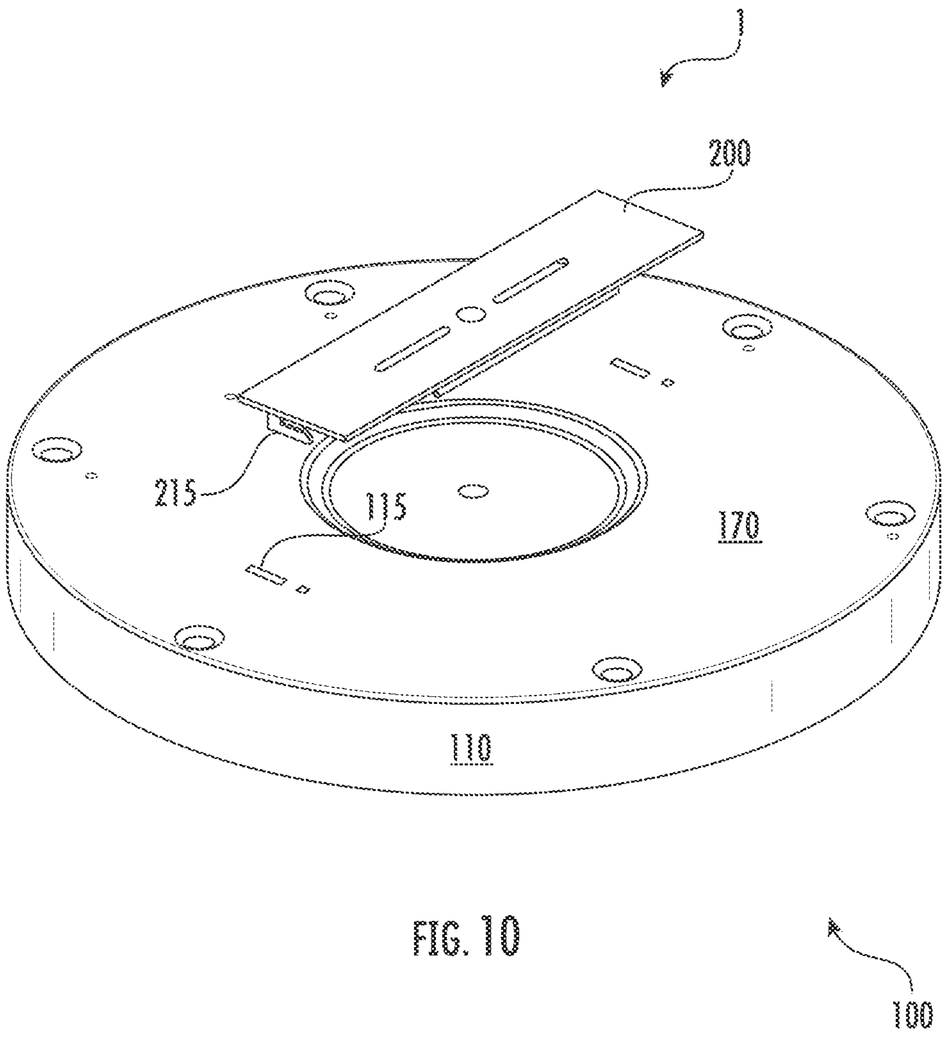
FIG. 10 is a perspective view of another embodiment of an LED flat panel lighting device and corresponding mounting bracket, in accordance with an embodiment of the present invention.

In an example embodiment, the LED flat panel lighting device 100 may be moved translationally (e.g., vertically, horizontally, or a combination thereof) with respect to the mounting bracket 200 to cause the attachment mechanism(s) 155 and the corresponding attachment mechanism mate(s) 215 to engage in a secure mating manner. An example embodiment in which the LED flat panel lighting device 100 may be moved translationally with respect to the mounting bracket 200 to secure the lighting device 100 to the mounting bracket 200 is shown in FIG. 10.

In example embodiments, as shown in FIG. 4, the junction mount 240 further comprises receiving member 244 configured to receiving the clip member 197 of the tether 195. For example, the junction mount 240 (or bracket frame 210) may comprise a receiving member 244 that separates a pair of adjacent receiving holes 244*a*, 244*b*. The clip member 197 may be passed through a first receiving hole 244*a*, across the receiving member 244, and a portion of the clip member 197 may then be passed through a second receiving hole 244*b*, effectively clipping, fastening, securing, affixing, and/or the like the clip member 197 to the receiving member 244. In an example embodiment, at least one of the first and second receiving holes 244*a*, 244*b* may be a mounting hole 242.

In various embodiments, the mounting bracket 200 may be made of a polymeric material or metal as is known in the art. For example, the mounting bracket 200 may be made of plastic, aluminum, and/or the like. In various embodiments, the mounting bracket 200 may be made of any material appropriate for the application. In example embodiments, the junction mount is made out of the same material as the bracket frame 210.

III. T-Bar Mounting Bracket 200'

In example embodiments, the mounting bracket of the LED lighting fixture 1 may be a T-bar mounting bracket. FIGS. 11A, 11B, and 12-15 provide various views of an example T-bar mounting bracket 200'. In example embodiments, a T-bar mounting bracket 200' comprises a first element 212 and a second element 214. The first element 212 and the second element 214 may be secured to each other to form a T-bar mounting bracket 200'. Each of the first element 212 and the second element 214 may comprise one or more attachment mechanism mates 215 configured to be mated with one or more attachment mechanisms 115 of the LED flat panel lighting device 100. The T-bar mounting bracket 200' may further comprise one or more mounting holes 242 configured to receive a fastener there through to secure, mount, affix, and/or the like the T-bar mounting bracket 200' to the junction box 510 and/or mounting surface 505. In example embodiments, the T-bar mounting bracket 200' comprises a receiving member 244 for securing, clipping, fastening, affixing, and/or the like a clip member 197 of a tether 195 to the T-bar mounting bracket 200'. In example embodiments, the T-bar mounting bracket 200' may further comprise a central opening 175 configured to allow the electrical connecting wires 190 to pass there through.

In example embodiments, the first element 212 comprise a generally planar member 216. For example, the planar member 216 may define a plane, that when the T-bar mounting bracket 200' is secured to a mounting surface 505, is generally parallel with a plane defined by the mounting surface 505. In an example embodiment, the planar member 216 may define a major axis 216*a* that is generally parallel to the length of the planar member 216 and a minor axis 216*b* that is generally parallel to the width of the planar member 216. The planar member 216 may have a length (along the major axis 216*a*) that is generally the length of the diameter of the back cover 170 (e.g., d1). The planar member 216 may have a width (along the minor axis 216*b*) that is generally less than two inches. For example, the planar member 216 may have a width of one inch to half an inch. The planar member 216 may comprise one or more mounting holes 242 there through. For example, two or four mounting holes 242 may be positioned along the length of the planar member 216. The planar member 216 may further comprise one or more receiving elements 244. Additionally, the planar member 216 may comprise a central opening 275 for receiving the electrical connecting wires 190 there through.

In example embodiments, the first element 212 may further comprise one or more attachment mechanism mates 215. For example, the attachment mechanism mates 215 may be tabs disposed on either end of the planar member 216. For example, a first attachment mechanism mate 215 may be disposed on a first end of the planar member 216 and a second attachment mechanism mate 215 may be disposed on a second end of the planar member 216, wherein the first end and the second end of the planar member 216 are separated by the length of the planar member 216. The one or more attachment mechanism mates 215 may be connected to the planar member 216 by a transverse member 217 that extends out of the plane defined by the planar member 216. In example embodiments, the transverse member 217 extends out of the plane defined by the planar member 216 at a 90 degree angle. In various embodiments, the transverse member 217 is approximately and/or is determined based on the thickness d of the LED flat panel lighting device 100. In example embodiments, the planar member 216, transverse member(s) 217, and attachment mechanism mate(s) 215 may be integrally formed. For example, the planar member 216, transverse member 217, and attachment mechanism mate(s) 215 may be formed by bending an appropriately sized piece of metal (e.g., aluminum or steel) or by molding a first element 212 from metal, plastic, and/or the like. For example, the first element 212 may be a single piece that comprises the planar member 216, one or two transverse members 217, and one or two attachment mechanism mates 215.

In example embodiments, the second element 214 may be identical to the first element 212. In some embodiments, the second element 214 may be similar to the first element 212 but may lack one or more mounting holes 242 and/or a receiving element 244. In example embodiments, the layout of the one or more mounting holes 242 through the second element 214 may be different from the layout of the one or more mounting holes 242 through the first element 212. Generally, the second element 214 may comprise a planar member 216, one or two transverse members 217, and one or two attachment mechanism mates 215, similar to the first element 212.

In example embodiments, the middle of the first element 212 is secured to the middle of the second element 214. For example, the first element 212 may be welded, riveted, glued, and/or the like to the second element 214. In some embodiments, the first element 212 and the second element 214 are integrally formed (e.g., molded, cut, bent, and/or the like from a single piece of plastic, metal, and/or the like). For example, the first element 212 and the second element 214 may be secured to one another such that the central opening 275 of the first element 212 is generally aligned with the central opening 275 of the second element 214. In example embodiments, the first element 212 and the second element 214 are askew with respect to one another. For example, the planar member 216 of the first element 212 may define a first plane and the planar member 2016 of the second element 214 may define a second plane. The first element 212 is secured to the second element 214 such that the first plane and the second plane are parallel. However, the first element 212 is secured to the second element 214 such that the major axis 216*a* of the first element 212 are not parallel to the major axis 216*a* of the second element 214. In example embodiments, the first element 212 is secured to the second element 214 such that the major axis 216*a* of the first element 212 is perpendicular to the major axis 216*a* of the second element 214.

IV. Exemplary Methods of Installing an LED Lighting Fixture 1

Figure 16:
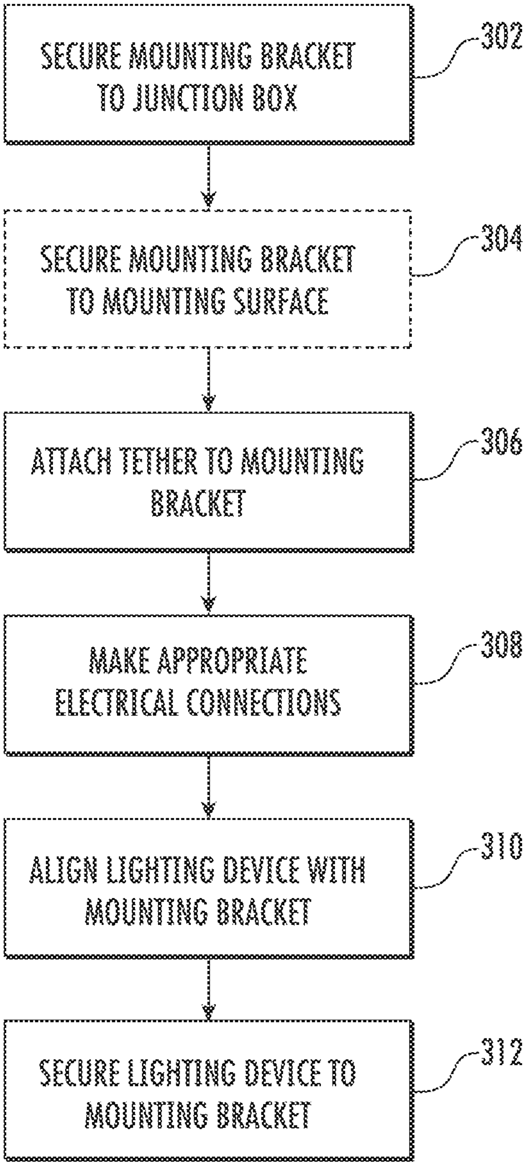
FIG. 16 is a flowchart illustrating various processes and procedures of installing an example LED lighting fixture, in accordance with example embodiments.

FIG. 16 provides a flowchart illustrating processes and procedures for installing an LED lighting fixture 1, in accordance with example embodiments of the present invention. Starting at block 302, the mounting bracket 200, 200' may be secured to the junction box 510. For example, one or more fasteners may be used to secure the mounting bracket 200, 200' to the junction box 510 by passing the one or more fasteners (e.g., screws) through mounting holes 242 of the junction mount 240 or the T-bar mounting bracket 200' and securing the fasteners to the junction box 510. For example, as shown in FIG. 2, the mounting bracket 200 may be secured to the junction box 510.

Continuing with FIG. 16, at block 304, the mounting bracket 200, 200' may optionally be secured to the mounting surface 505. For example, one or more fasteners may be used to secure the mounting bracket 200, 200' to the mounting surface 505 may passing the one or more fasteners (e.g., screws) through mounting holes 242 of the junction mount 240 or the T-bar mounting bracket 200' and securing the fasteners to the junction box 510. In example embodiments, dry-wall anchors and/or the like may be installed into the mounting surface 505 for receiving and retaining the fasteners therein.

At block 306, the tether 195 of the LED flat panel lighting device 100 is attached to the mounting bracket 200, 200'. For example, the clip member 197 may be passed through a first receiving hole 244*a*, passed behind a receiving member 244, and a portion of the clip member 197 may be passed through the second receiving hole 244*b* such that the clip member 197 is clipped about the receiving member 244. For example, the LED flat panel lighting device 100 may be attached to the mounting bracket 200, 200' as shown in FIGS. 3 and 15. The LED flat panel lighting device 100 may then be allowed to hang from the tether 195 as the electrical connections between the LED flat panel lighting device 100 and the junction box 510 are made at block 308 of FIG. 16. For example, the electrical connecting wires 190 may be secured into electrical connection with the corresponding line voltage wires 520. For example, a first electrical connecting wire 190 may be secured into electrical connection with a corresponding line voltage wire 520 using a wire nut, and/or the like, as shown in FIG. 4.

Figure 6:
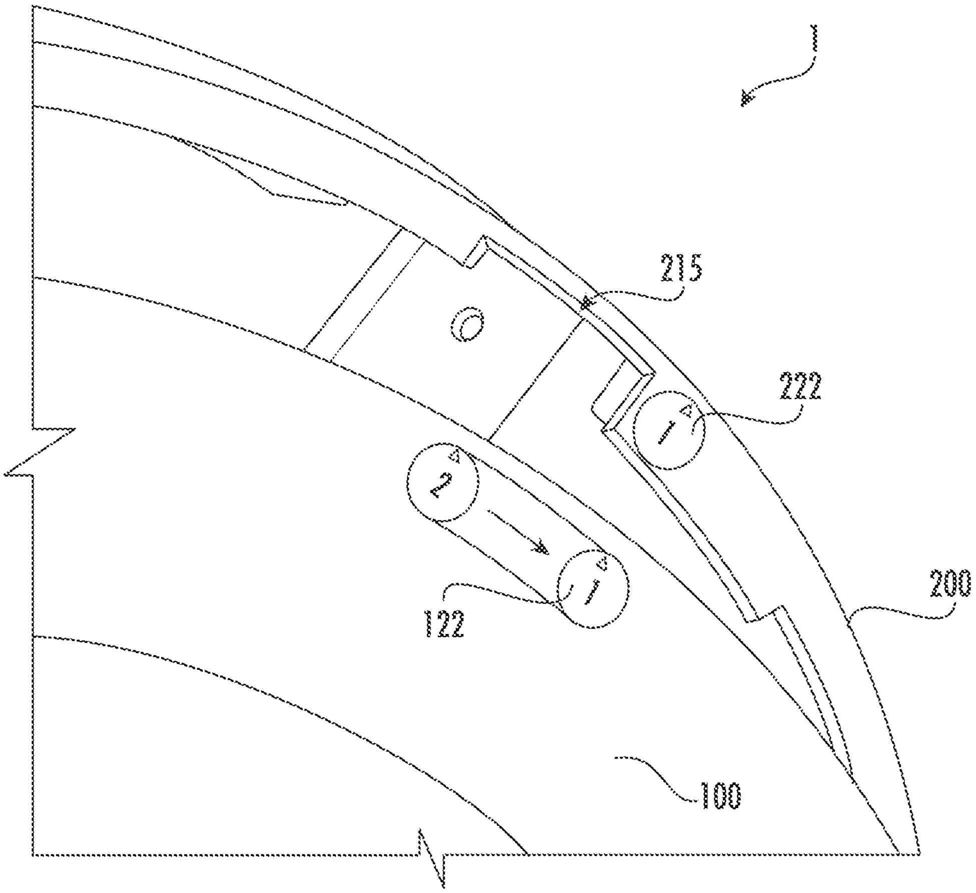
FIG. 6 is a close up perspective view of aligning an LED flat panel lighting device with a mounting bracket, in accordance with an embodiment of the present invention.
Figure 7:
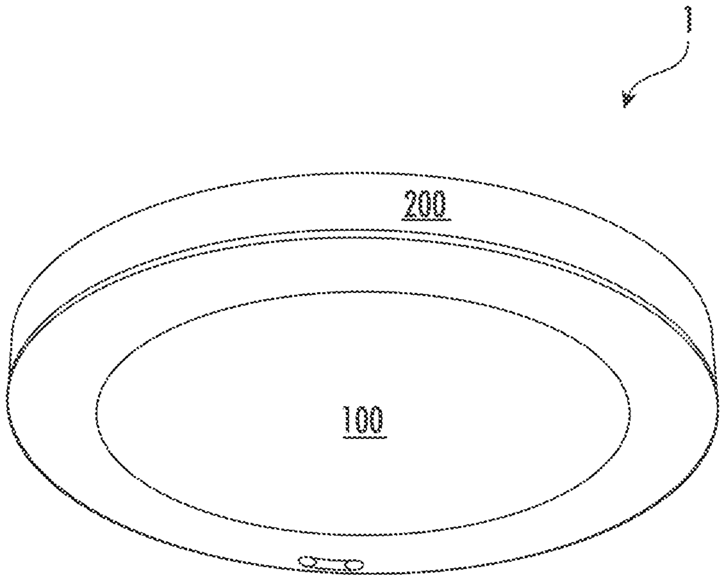
FIG. 7 is a perspective view of an LED flat panel lighting device being secured to a mounting bracket, in accordance with an embodiment of the present invention.
Figure 12:
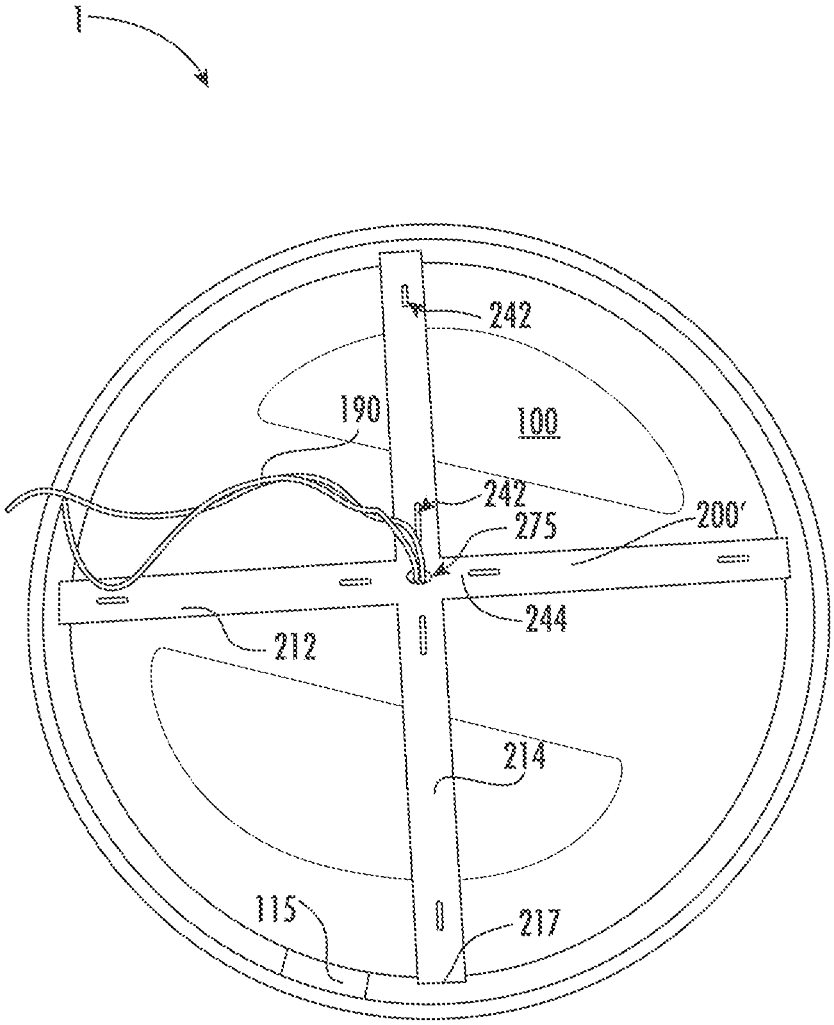
FIG. 12 is a perspective view of a T-bar mounting bracket and corresponding LED flat panel lighting device, in accordance with an embodiment of the present invention.

Continuing with FIG. 16, at block 310, the LED flat panel lighting device 100 is aligned with the mounting bracket 200, 200'. For example, the alignment guide 122 of the LED flat panel lighting device 100 may be aligned with an alignment guide 222 of the mounting bracket 200, 200'. For example, FIGS. 5, 6, and 12 illustrate an LED flat panel lighting device 100 being aligned with the mounting bracket 200, 200'. At block 312 of FIG. 16, the LED flat panel lighting device 100 may be secured into the mounting bracket 200, 200'. For example, FIGS. 7 and 15 illustrate the LED flat panel lighting device 100 secured into the mounting bracket 200, 200'. For example, the LED flat panel lighting device 100 may be rotated with respect to the mounting bracket 200, 200'. As the LED flat panel lighting device 100 is rotated with respect to the mounting bracket 200, 200', the attachment mechanisms 115 may mate with the corresponding attachment mechanism mates 215. In example embodiments, the mating of the attachment mechanisms 115 and the corresponding attachment mechanism mates 215 may fixedly secure, mount, affix, and/or the like the LED flat panel lighting device 100 into the mounting bracket 200, 200'.

Thus, example embodiments of the present invention provide improved lighting fixtures. For example, example embodiments provide a lighting device that may be wired to a junction box by a single installer. For example, the tether 195 may be configured to suspend the lighting device from the mounting bracket such that the electrical connections may be made without the lighting device needing to be held next to the mounting bracket by hand. In another example, example embodiments, provide lighting fixtures that may be flush mounted to junction boxes such that additional room is not required, for example, above a ceiling to accommodate the lighting fixture. In yet another example, example embodiments provide a T-bar mounting bracket 200' for flush mounting a lighting device to a junction box. The T-bar mounting bracket 200' is configured to securely mount the lighting device and to provide for an easy installation.

V. Conclusion

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A mounting bracket for flush mounting a lighting device, the mounting bracket comprising:

a first planar member having a center, two adjacent openings offset in a first direction from the center along a longitudinal axis of the first planar member, and a receiving member positioned intermediate the two adjacent openings, at least one transverse member disposed at an end of the first planar member, and at least one attachment mechanism mating element disposed on a free end of the at least one transverse member, wherein the at least one attachment mechanism mating element extends, in a direction along the longitudinal axis, beyond an adjacently positioned of the opposite ends of the first planar member.

2. The mounting bracket of claim 1, wherein the receiving member is configured to have a clip member of a tether of the lighting device secured thereto.

3. The mounting bracket of claim 1, wherein:

the at least one attachment mechanism mating element is configured to engage a corresponding attachment mechanism disposed on the lighting device to secure the lighting device to the mounting bracket.

4. The mounting bracket of claim 1, wherein the at least one attachment mechanism mating element is perpendicular to the at least one transverse member.

5. The mounting bracket of claim 3, wherein the at least one transverse member lies in a first plane, the first plane being perpendicular to a second plane in which the planar member lies.

6. The mounting bracket of claim 5, wherein the at least one attachment mechanism mating element lies in a third plane parallel to and spaced apart from the first and second planes, the second and third planes being spaced apart relative to one another by a length of the at least one transverse member.

7. The mounting bracket of claim 1, further comprising a second planar member having a center and at least one transverse member disposed at an end thereof, two adjacent openings offset from the center, and a receiving member positioned intermediate the two adjacent openings in alignment with a longitudinal axis of the second planar member.

8. A mounting bracket for flush mounting a lighting device, the mounting bracket comprising:

one elongated planar member having a center positioned on a primary axis, two adjacent openings offset from the center, and a receiving member offset in a first direction from the center, the receiving member being positioned intermediate the two openings, at least one transverse member disposed at one end of the one elongated planar member, and at least one attachment mechanism mating element disposed on a free end of the at least one transverse member, wherein the at least one attachment mechanism mating element extends beyond an adjacently positioned of the opposite ends of the elongated planar member.

9. The mounting bracket of claim 8, wherein the receiving member is configured to have a clip member of a tether of the lighting device secured thereto.

10. The mounting bracket of claim 8, wherein:

the at least one attachment mechanism mating element is configured to engage a corresponding attachment mechanism disposed on the lighting device to secure the lighting device to the mounting bracket.

11. The mounting bracket of claim 8, wherein the at least one attachment mechanism mating element is perpendicular to the at least one transverse member.

12. The mounting bracket of claim 10, wherein the at least one transverse member lies in a first plane, the first plane being perpendicular to a second plane in which the planar member lies.

13. The mounting bracket of claim 12, wherein the at least one attachment mechanism mating element lies in a third plane parallel to and spaced apart from the second planes, the second and third planes being spaced apart relative to one another by a length of the at least one transverse member.

14. The mounting bracket of claim 8, further comprising a second planar member having a center and at least one transverse member disposed at an end thereof, two adjacent openings offset from the center, and a receiving member positioned intermediate the two adjacent openings.

15. The mounting bracket of claim 14, wherein each of the first and second planar members has a respective longitudinal axis, the respective longitudinal axes being oriented perpendicular relative to one another.

16. The mounting bracket of claim 15, wherein the two adjacent openings and the receiving member of each of the first and second planar members are aligned with and extend along the respective longitudinal axis of an associated one of the first and second planar members.

17. The mounting bracket of claim 14, wherein each of the first and second planar members has a respective longitudinal axis, the respective longitudinal axes being oriented perpendicular relative to one another.

18. A mounting bracket for flush mounting a lighting device, the mounting bracket comprising:

two elongated planar members each having a respective center, each of the two elongated planar members lying in one of a first plane or a second plane that are each parallel with one another, and at least one transverse member disposed in a third plane, wherein:

the one of the at least two elongated planar members includes two adjacent openings and a receiving member offset from the center of the planar member, the receiving member being positioned intermediate the two openings, and the third plane is perpendicular to both the first and the second plane.

19. The mounting bracket of claim 18, wherein:

the mounting bracket further comprises at least one attachment mechanism mating element disposed on an end of one of the at least one transverse member opposite the planar member; and the at least one attachment mechanism mating element is configured to engage a corresponding attachment mechanism disposed on the lighting device to secure the lighting device to the mounting bracket.

20. The mounting bracket of claim 19, wherein the at least one attachment mechanism mating element extends from the end of the at least one transverse member such that at least a portion of the at least one attachment mechanism mating element is not parallel to the at least one transverse member.

* * * * *